US012489253B2

(12) United States Patent
Ho et al.

(10) Patent No.: US 12,489,253 B2
(45) Date of Patent: Dec. 2, 2025

(54) ELECTRICAL CONNECTOR

(71) Applicant: LOTES CO., LTD, Keelung (TW)

(72) Inventors: Chien Hung Ho, Keelung (TW); Yue Gao Li, Keelung (TW); Jian Hui Wen, Keelung (TW); Yong You Yu, Keelung (TW)

(73) Assignee: LOTES CO., LTD, Keelung (TW)

( * ) Notice: Subject to any disclaimer, the term of this patent is extended or adjusted under 35 U.S.C. 154(b) by 294 days.

(21) Appl. No.: 18/233,999

(22) Filed: Aug. 15, 2023

(65) Prior Publication Data

US 2024/0063579 A1 Feb. 22, 2024

(30) Foreign Application Priority Data

Aug. 16, 2022 (CN) ......................... 202210978691.7

(51) Int. Cl.

| | |
|---|---|
| ***H01R 13/6471*** | (2011.01) |
| ***H01R 12/71*** | (2011.01) |
| ***H01R 13/24*** | (2006.01) |
| ***H01R 13/516*** | (2006.01) |

(52) U.S. Cl.

CPC ....... *H01R 13/6471* (2013.01); *H01R 12/714* (2013.01); *H01R 13/2442* (2013.01); *H01R 13/516* (2013.01)

(58) Field of Classification Search

CPC ............ H01R 13/6417; H01R 13/2442; H01R 13/516; H01R 12/714

See application file for complete search history.

(56) References Cited

U.S. PATENT DOCUMENTS

| | | | | |
|---|---|---|---|---|
| 8,382,487 B2 | 2/2013 | Jeon et al. | | |
| 10,910,748 B2 | 2/2021 | Mason et al. | | |
| 2013/0231009 A1* | 9/2013 | Jeon .................. | H01R 13/2442 439/660 | |

FOREIGN PATENT DOCUMENTS

| | | |
|---|---|---|
| CN | 2727996 Y | 9/2005 |
| CN | 2909627 Y | 6/2007 |
| CN | 201113143 Y | 9/2008 |
| CN | 202712530 U | 1/2013 |
| CN | 103311698 B | 8/2016 |
| CN | 112397921 A | 2/2021 |
| CN | 112952412 A | 6/2021 |
| CN | 113130432 A | 7/2021 |

* cited by examiner

*Primary Examiner* — Sean Gugger

(74) *Attorney, Agent, or Firm* — Troutman Pepper Locke LLP; Tim Tingkang Xia, Esq.

(57) ABSTRACT

An electrical connector includes: an insulating body, in which one region has a plurality of accommodating slots; and a plurality of terminals, accommodated in the accommodating slots in the region. Each terminal has a base portion and an extending arm extending from the base portion. The extending arm is provided with a contact portion, which is used to be in contact with an electrical component along a vertical direction. The terminals located in the region include a first signal terminal and a second signal terminal. Viewing along the vertical direction, the pointing direction of the first signal terminal and the pointing direction of the second signal terminal are different, and the base portion of the first signal terminal and the contact portion of the first signal terminal is located farther away from the base portion of the second signal terminal than the contact portion of the first signal terminal.

15 Claims, 15 Drawing Sheets

ELECTRICAL CONNECTOR

CROSS-REFERENCE TO RELATED PATENT APPLICATION

This non-provisional application claims priority to and the benefit of, pursuant to 35 U.S.C. § 119(a), patent application Serial No. CN202210978691.7 filed in China on Aug. 16, 2022. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to an electrical connector, and particularly to an electrical connector which may reduce crosstalk.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A conventional electrical connector is used to electrically connect a chip module and a circuit board. The electrical connector includes an insulating body and a plurality of conductive terminals accommodated in the insulating body. Each conductive terminal is provided with a body portion, an elastic arm extending from the body portion, and a contact portion extending from the elastic arm. The insulating body is provided with a plurality of terminal accommodating slots to accommodate the conductive terminals. To avoid the horizontal friction of the conductive terminals to the chip module from causing the chip module to slide horizontally, the insulating body is divided into different regions. The extending directions of the elastic arms of the conductive terminals in a same region are identical, and the extending directions of the elastic arms of the conductive terminals in different regions are different. Examples exists in Chinese Patent Nos. CN200420078407.8, CN200620070308.4, CN200720058248.9, and CN202010798916.1, etc.

In the electrical connector, the conductive terminals in the same region are arranged regularly and repetitively. That is, the conductive terminals in the same region are arranged at intervals according to a certain distance. However, the conductive terminals in the same region generally include a plurality of signal terminals, and signal interferences may exist between the signal terminals arranged according to a certain distance. In particular, in a flat grid connector, to be electrically connected to the chip module, the conductive terminals are arranged densely, and the distances between the signal terminals are short, resulting in serious crosstalk between the signal terminals.

To address the crosstalk issue between the signal terminals, the industry often adopts the following technical solutions. Firstly, the periphery of the signal terminals may be provided with ground terminals. For example, multiple ground terminals are provided to surround a pair of the signal terminals, thus reducing the crosstalk between two adjacent pairs of the signal terminals. However, after the locations of the ground terminals of the electrical connector are adjusted, they may not necessarily fit with the locations of the corresponding grounding pads in the chip module or the circuit board, thus affecting the adaptability of the electrical connector. An example exists in Chinese Patent No. CN202110101795.5. Secondly, a shielding coating layer may be added on an inner wall of each terminal accommodating slot, thus performing signal shielding between different signal terminals, and reducing the crosstalk between the signal terminals. However, this requires additionally providing an insulating material to electrically isolate the signal terminal and the shielding coating layer, thus having a complex manufacturing technique and increasing the production cost thereof. An example exists in Chinese Patent No. CN201220272434.3.

Therefore, a heretofore unaddressed need to design a new electrical connector exists in the art to address the aforementioned deficiencies and inadequacies.

SUMMARY

The present invention is directed to an electrical connector, in which the base portion of the first signal terminal is located farther away from a location of the base portion of the second signal terminal. Thus, on the premise of maintaining the location of the contact portion to be unchanged and maintaining the contact between the contact portion and the corresponding location of the electrical component, a distance between the base portion of the first signal terminal and the base portion of the second signal terminal is increased, thereby reducing the crosstalk between the first signal terminal and the second signal terminal.

To achieve the foregoing objective, the present invention adopts the following technical solutions. An electrical connector includes: an insulating body, comprising at least one region, wherein one region of the at least one region has a plurality of accommodating slots; and a plurality of terminals, accommodated in the accommodating slots in the one region, wherein each of the terminals has a base portion and an extending arm extending from the base portion, the extending arm is provided with a contact portion, the contact portion is configured to be in contact with an electrical component along a vertical direction, the contact portions of the terminals are arranged in the one region in a plurality of rows and a plurality of columns based on a constant first row distance and a constant first column distance; the base portion has a first reference point, the contact portion has a second reference point, and viewing from the vertical direction, a direction from the first reference point toward the second reference direction is defined as a pointing direction corresponding to each of the terminals. The terminals located in the one region comprises a first signal terminal and a second signal terminal, viewing along the vertical direction, the pointing direction of the first signal terminal and the pointing direction of the second signal terminal are different from each other, and the base portion of the first signal terminal is located farther away from the base portion of the second signal terminal than the contact portion of the first signal terminal.

In certain embodiments, viewing along the vertical direction, the contact portion of the first signal terminal and the contact portion of the second signal terminal are located in a straight line of a same row or a same column, and the base portion of the first signal terminal and the base portion of the second signal terminal are respectively located at two sides of the straight line.

In certain embodiments, the terminals comprises a third signal terminal, viewing along the vertical direction, the contact portion of the first signal terminal, the contact portion of the second signal terminal and the contact portion of the third signal terminal are all located in the straight line, the contact portion of the first signal terminal is located between the contact portion of the second signal terminal and the contact portion of the third signal terminal along the straight line, and the base portion of the second signal terminal and the base portion of the third signal terminal are located at a same side of the straight line.

In certain embodiments, the base portion of the second signal terminal is located farther away from the base portion of the third signal terminal than the contact portion of the second signal terminal.

In certain embodiments, the terminals further comprise at least one ground terminal provided to be adjacent to the second signal terminal, and the pointing direction of the second signal terminal and the pointing direction of the ground terminal are identical to each other.

In certain embodiments, the terminals further comprises a third signal terminal, the pointing direction of the first signal terminal, the pointing direction of the second signal and the pointing direction of the third signal terminal are different from one another, the base portion of the first signal terminal, the base portion of the second signal terminal and the base portion of the third signal terminal are away from one another, and the first signal terminal, the second signal terminal and the third signal terminal are all configured to transmit single-ended signals.

In certain embodiments, each of the terminals comprises a first body and a second body, the first body has a first body portion and the extending arm extending from the first body portion, the second body has a second body portion, a plate surface of the first body portion and a plate surface of the second body portion are in communication with each other along the vertical direction and altogether form the base portion of each of the terminals, and the first bodies of the terminals located in the one region are formed by cutting and punching a single-sheet material; or the base portion of each of the terminals has two plate surfaces provided opposite to each other along the vertical direction, and the base portions and the extending arms of the terminals located in the one region are formed by cutting and punching a single-sheet material.

Compared to the related art, the electrical connector according to certain embodiments of the present invention has the following beneficial effects:

Since the base portion of the first signal terminal is located farther away from the base portion of the second signal terminal than the contact portion of the first signal terminal, the location of the contact portion of the first signal terminal maintains unchanged, such that there is no need to adjust the locations of the conductive sheets of the electrical components (such as the chip module or the circuit board), and the originally adopted electrical components may be directly used, thus enhancing the adaptability of the electrical connector. Further, the distance between the base portion of the first signal terminal and the base portion of the second signal terminal is increased, thus reducing the mutual crosstalk between the first signal terminal and the second signal terminal. Meanwhile, compared to the solution of providing the shielding coating layer on the inner wall of each accommodating slot, in certain embodiments of the present invention, the location of the base portion of the terminal is adjusted, thus having a simple technique and reducing the production cost thereof.

To achieve the foregoing objective, the present invention adopts the following technical solutions. An electrical connector includes: an insulating body, comprising at least one region, wherein one of the at least one region has a plurality of accommodating slots; and a plurality of terminals, accommodated in the accommodating slots in the one region, wherein each of the terminals has a base portion and an extending arm extending from the base portion, the extending arm is provided with a contact portion, the contact portion is configured to be in contact with an electrical component along a vertical direction, the contact portions of the terminals are arranged in the one region in a plurality of rows and a plurality of columns based on a constant first row distance and a constant first column distance; the base portion has a first reference point, the contact portion has a second reference point, and viewing from the vertical direction, a direction from the first reference point toward the second reference direction is defined as a pointing direction corresponding to each of the terminals. The terminals located in the one region comprises a first pair of differential terminals and a second pair of differential terminals, the first pair of differential terminals comprises a first terminal and a second terminal provided to be adjacent to each other, the pointing direction of the first terminal and the pointing direction of the second terminal are identical, the second pair of differential terminals comprises a third terminal and a fourth terminal provided to be adjacent to each other, the pointing direction of the third terminal and the pointing direction of the fourth terminal are identical, viewing along the vertical direction, the pointing direction of the first terminal and the pointing direction of the third terminal are different from each other, and the base portion of the first terminal is located farther away from the base portion of the third terminal than the contact portion of the first terminal.

In certain embodiments, the pointing direction of the first terminal and the pointing direction of the third terminal are parallel and opposite to each other.

In certain embodiments, the two contact portions of the first pair of differential terminals and the two contact portions of the second pair of differential terminals are located in two adjacent ones of the rows, the contact portion of the third terminal and the contact portion of the fourth terminal and the contact portions of a plurality of non-differential terminals are located in a same row of the rows, and the pointing direction of each of the non-differential terminals and the pointing direction of the third terminal are identical.

In certain embodiments, the first pair of differential terminals are located at an edge location of a terminal area formed by the terminals.

In certain embodiments, each of the terminals comprises a first body and a second body, the first body has a first body portion and the extending arm extending from the first body portion, the second body has a second body portion, the first body portion and the second body portion are in communication with each other, a plate surface of the first body portion and a plate surface of the second body portion are provided opposite to each other along the vertical direction, the base portion comprises the first body portion and the second body portion, and the first bodies of the terminals located in the one region are formed by cutting and punching a single-sheet material; or the base portion of each of the terminals has two plate surfaces provided opposite to each other along the vertical direction, and the base portions and the extending arms of the terminals located in the one region are formed by cutting and punching a single-sheet material.

In certain embodiments, the two contact portions of the first pair of differential terminals and the two contact portions of the second pair of differential terminals are located in two adjacent ones of the rows, the contact portion of the first terminal, the contact portion of the second terminal, the contact portion of the third terminal and the contact portion of the fourth terminal are located in four adjacent ones of the columns, and the pointing direction of the first terminal and the pointing direction of the third terminal are provided opposite to each other.

In certain embodiments, the terminals further comprise a third pair of differential terminals, the third pair of differential terminals comprises a fifth terminal and a sixth terminal provided to be adjacent to each other, the pointing direction of the fifth terminal and the pointing direction of the sixth terminal are identical, and viewing along a column direction, projections of the first pair of differential terminals and projections of the second pair of differential terminals are completely staggered.

In certain embodiments, the contact portion of the third terminal and the contact portion of the fifth terminal are located in a same one of the columns, the contact portion of the fourth terminal and the contact portion of the sixth terminal are located in a same one of the columns, the terminals have two non-differential terminals located between the second pair of differential terminals and the third pair of differential terminals along the column direction, and the pointing direction of the third terminal, the pointing direction of the fifth terminal and the pointing direction of each of the non-differential terminals located between the second pair of differential terminals and the third pair of differential terminals are identical.

Compared with the related art, the electrical connector according to certain embodiments of the present invention has the following beneficial effects:

The locations of the two contact portions of the first pair of differential terminals may maintain unchanged to fit with the original electrical components (such as the chip module or the circuit board), and the two base portions of the first pair of differential terminals may be adjusted to be located away from the two base portions of the second pair of differential terminals. Thus, in certain embodiments of the present invention, the distances between the two base portions of the first pair of the differential terminals and the two base portions of the second pair of differential terminals are increased, thus reducing the mutual crosstalk between the first pair of differential terminals and the second pair of differential terminals. Further, in this solution, the location arrangements of the contact portions of the terminals in the electrical connector are unchanged, such that there is no need to adjust the locations of the conductive sheets of the electrical components (such as the chip module or the circuit board), and the originally adopted electrical components may be directly used, thus enhancing the adaptability of the electrical connector. Meanwhile, compared to the solution of providing the shielding coating layer on the inner wall of each accommodating slot, in certain embodiments of the present invention, the location of the base portion of the terminal is adjusted, thus having a simple technique and reducing the production cost thereof.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

Figure 1:
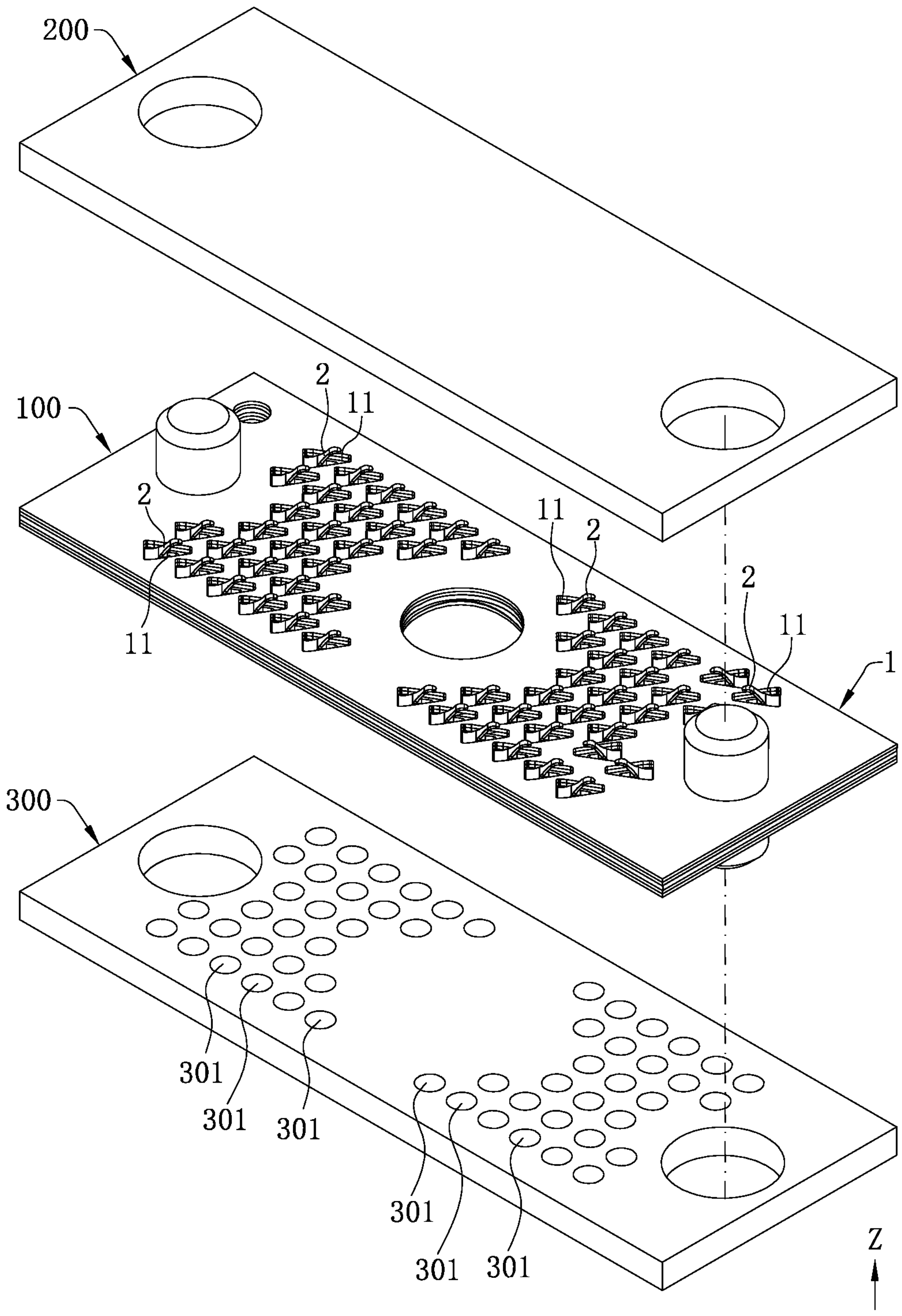
FIG. 1 is a perspective schematic view of an electrical connector, a first electrical component and a second electrical component according to a first embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

The description will be made as to the embodiments of the present invention in conjunction with the accompanying drawings in FIGS. 1-15. In accordance with the purposes of this invention, as embodied and broadly described herein, this invention, in one aspect, relates to an electrical connector.

Figure 2:
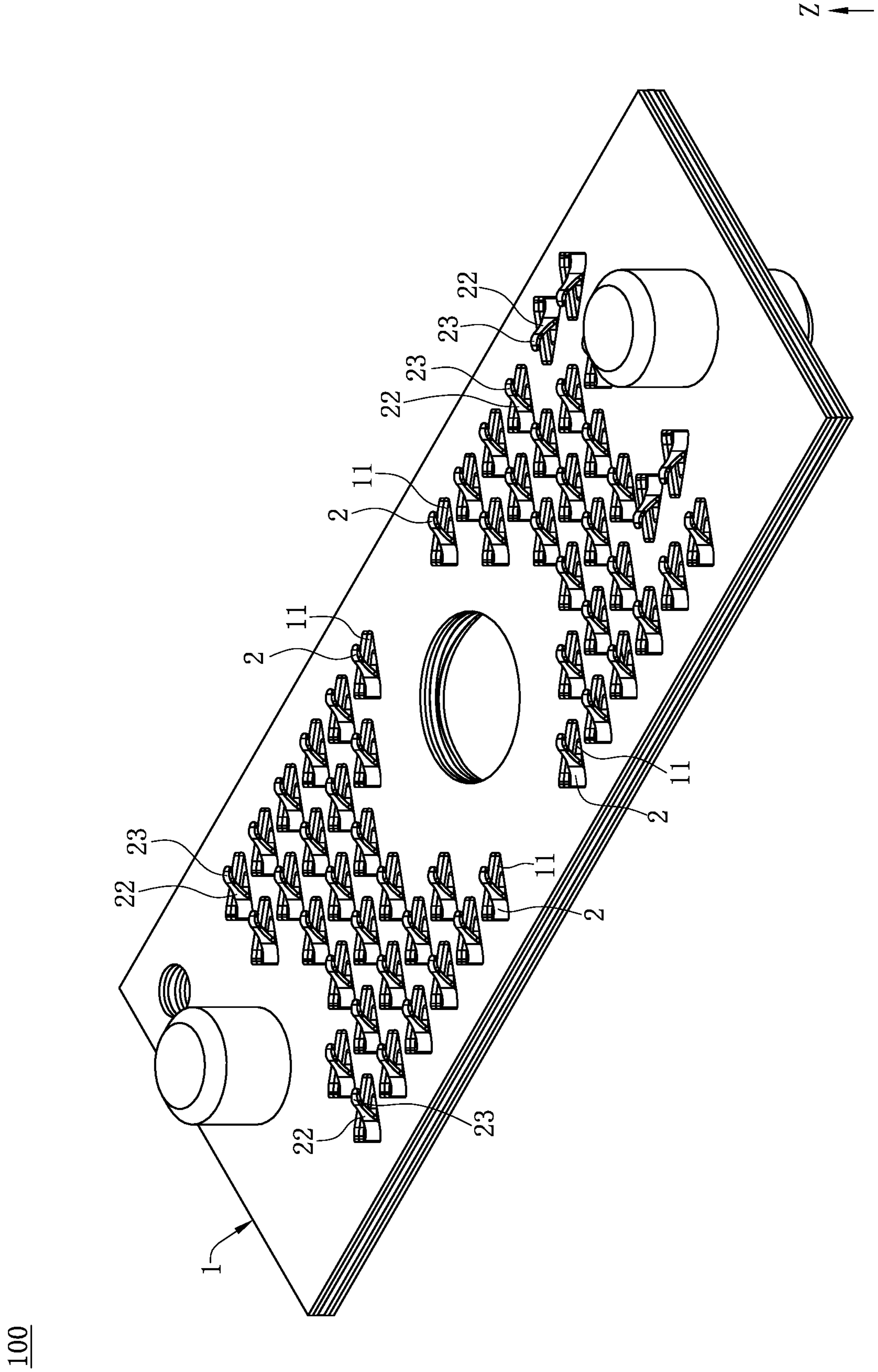
FIG. 2 is a perspective schematic view of the electrical connector according to the first embodiment of the present invention.

Referring to FIG. 1 and FIG. 2, an electrical connector 100 is provided according to the first embodiment of the present invention, which is connected between a first electrical component 200 and a second electrical component 300 along a vertical direction. The electrical connector 100 includes an insulating body 1 and a plurality of terminals 2 fixed to the insulating body 1. The insulating body 1 is provided with two regions, that is, a first region Q1 and a second region Q2, and each region is provided with a plurality of accommodating slots 11 to accommodate the terminals 2. In other embodiments, the insulating body 1 may be provided with only one region or more than two regions, without being limited thereto. The first electrical component 200 and the second electrical component 300 may respectively be a chip module and a circuit board. It is also possible that the first electrical component 200 and the second electrical component 300 are both circuit boards.

Figure 3:
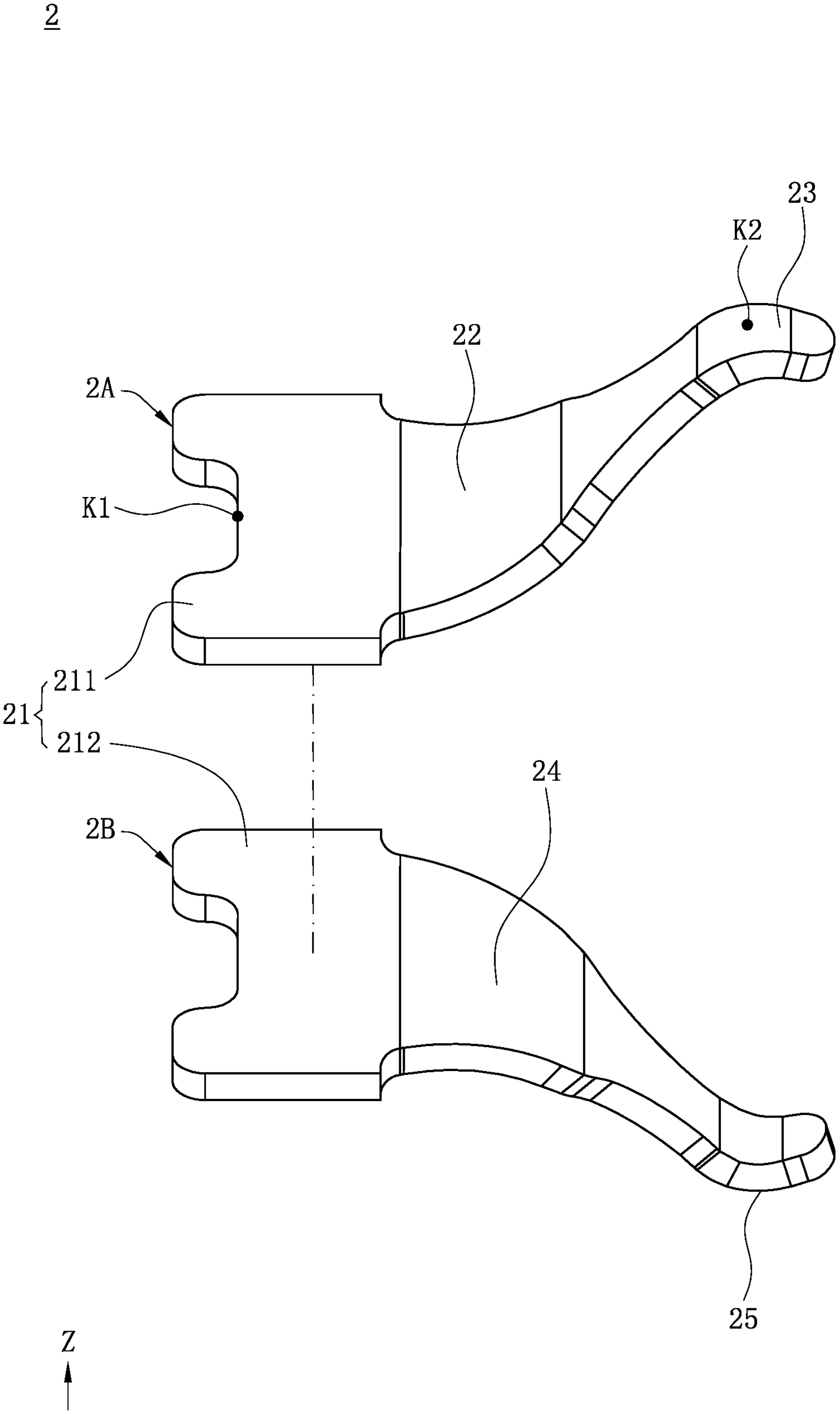
FIG. 3 is a perspective exploded view of a terminal according to the first embodiment of the present invention.
Figure 4:
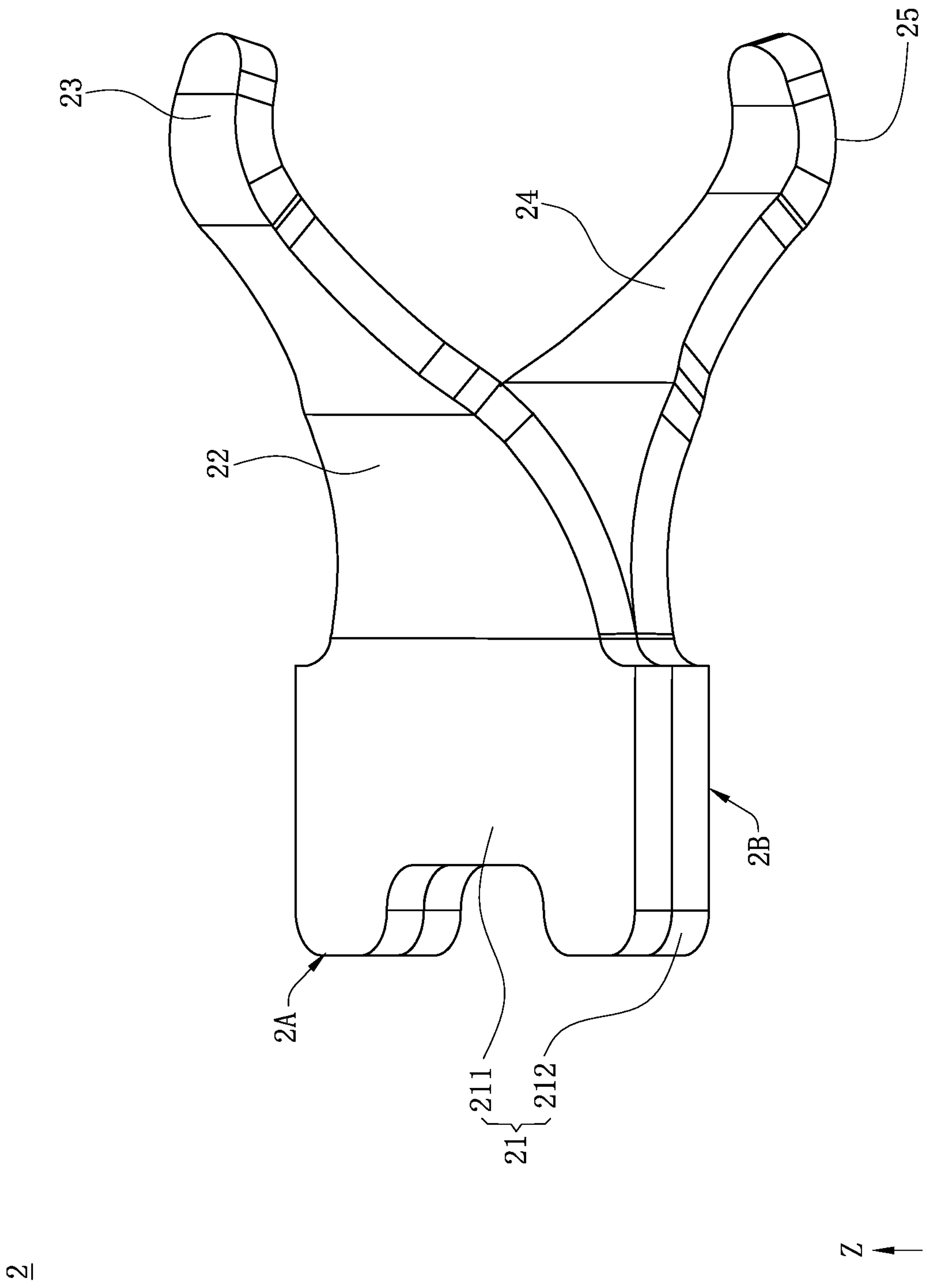
FIG. 4 is a perspective view of the terminal according to the first embodiment of the present invention.

Referring to FIG. 3 and FIG. 4, in the present embodiment, each terminal 2 includes a base portion 21, a first extending arm 22 extending from the base portion 21, a second extending arm 24 extending from the base portion 21, a first contact portion 23 provided on the first extending arm 22 and a second contact portion 25 provided on the second extending arm 24. In each terminal 2, the first contact portion 23 is used to be electrically connected with the first electrical component 200 along the vertical direction, and the second contact portion 25 is used to be electrically connected with the second electrical component 300 along the vertical direction. In the present embodiment, each terminal 2 is a double-sided compression type elastic terminal 2, and each terminal 2 is provided to be vertically symmetrical. The first contact portion 23 is in abutting contact with the first electrical component 200, and the second contact portion 25 is in abutting contact with the second electrical component 300.

Referring to FIG. 3 and FIG. 4, for each terminal 2, the base portion 21 has a first reference point K1, and the first contact portion 23 has a second reference point K2. Viewing from the vertical direction, a direction from the first reference point K1 toward the second reference direction K2 is defined as a pointing direction corresponding to each terminal 2. It should be noted that any point of the base portion 21 may function as the first reference point, and any point of the first contact portion 23 may function as the second reference point, but the first reference points of the terminals 2 must be at the same locations of the terminals 2, and the second reference points of the terminals 2 must be at the same locations of the terminals 2. For example, as shown in FIG. 3, in the present embodiment, each terminal 2 uses the location of the point K1 as the first reference point, and each terminal 2 use the location of the point K2 as the second reference point. In other embodiments, the second reference point may be provided on the second contact portion 25 and not provided on the first contact portion 23.

Figure 5:
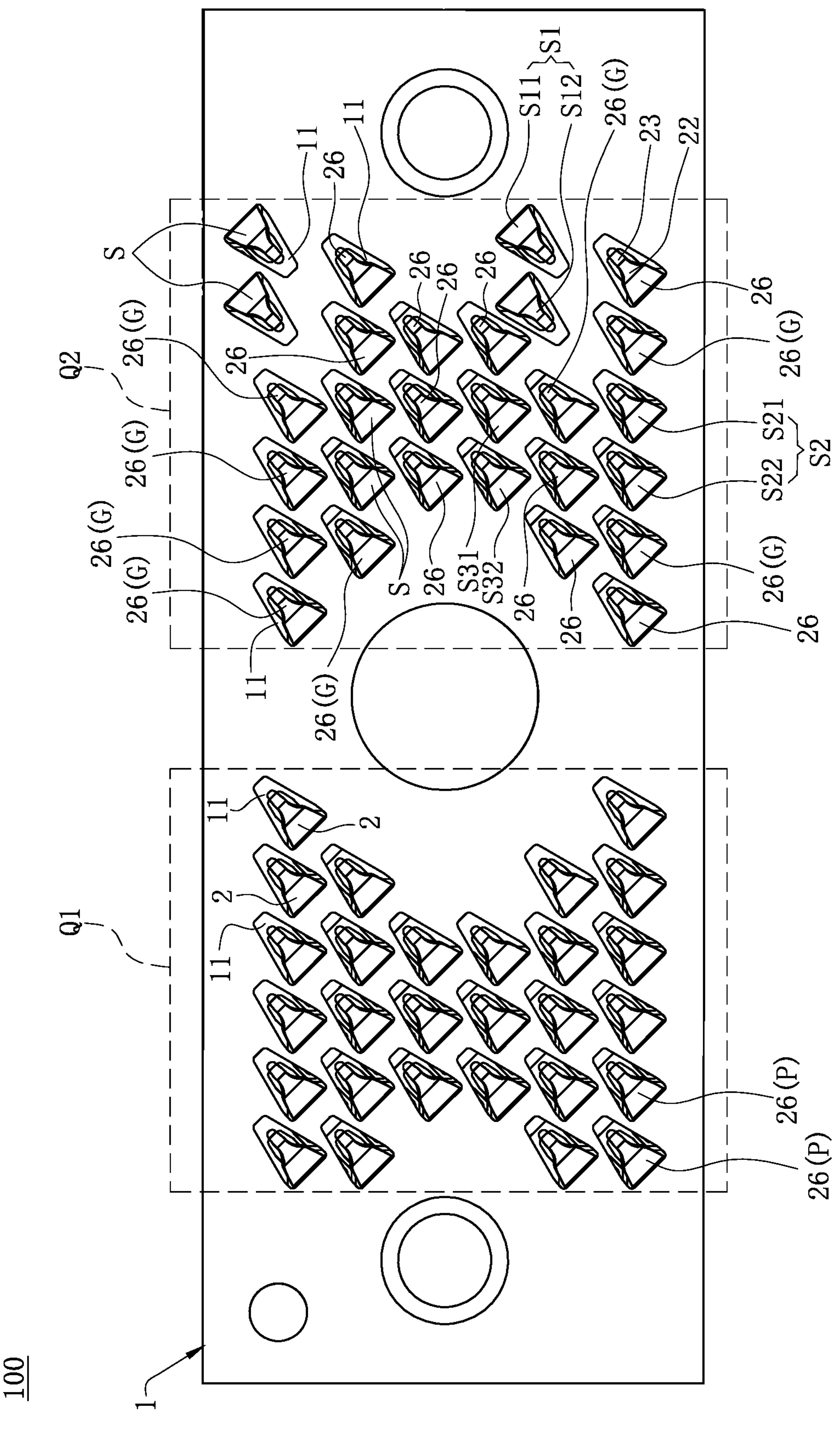
FIG. 5 is a top view of the electrical connector according to the first embodiment of the present invention.

Referring to FIG. 5, for the terminals 2 in the same region, the first contact portions 23 of the terminals 2 are arranged in the region in a plurality of rows and a plurality of columns based on a constant first row distance and a constant first column distance, and the second contact portions 25 of the terminals 2 are arranged in the region in a plurality of rows and a plurality of columns based on a constant second row distance and a constant second column distance. It should be noted that the first row distance, the first column distance, the second row distance and the second column distance are provided according to actual needs, and the terms "first" and "second" are used merely for convenience to understand and distinguish between the distances, without representing the distances being identical or different. The first electrical component 200 has a plurality of first conductive portions (not illustrated, same below) to be in contact with the first contact portions 23 of the terminals 2, and the second electrical component 300 has a plurality of second conductive portions 301 to be in contact with the second contact portions 25 of the terminals 2.

Figure 6:
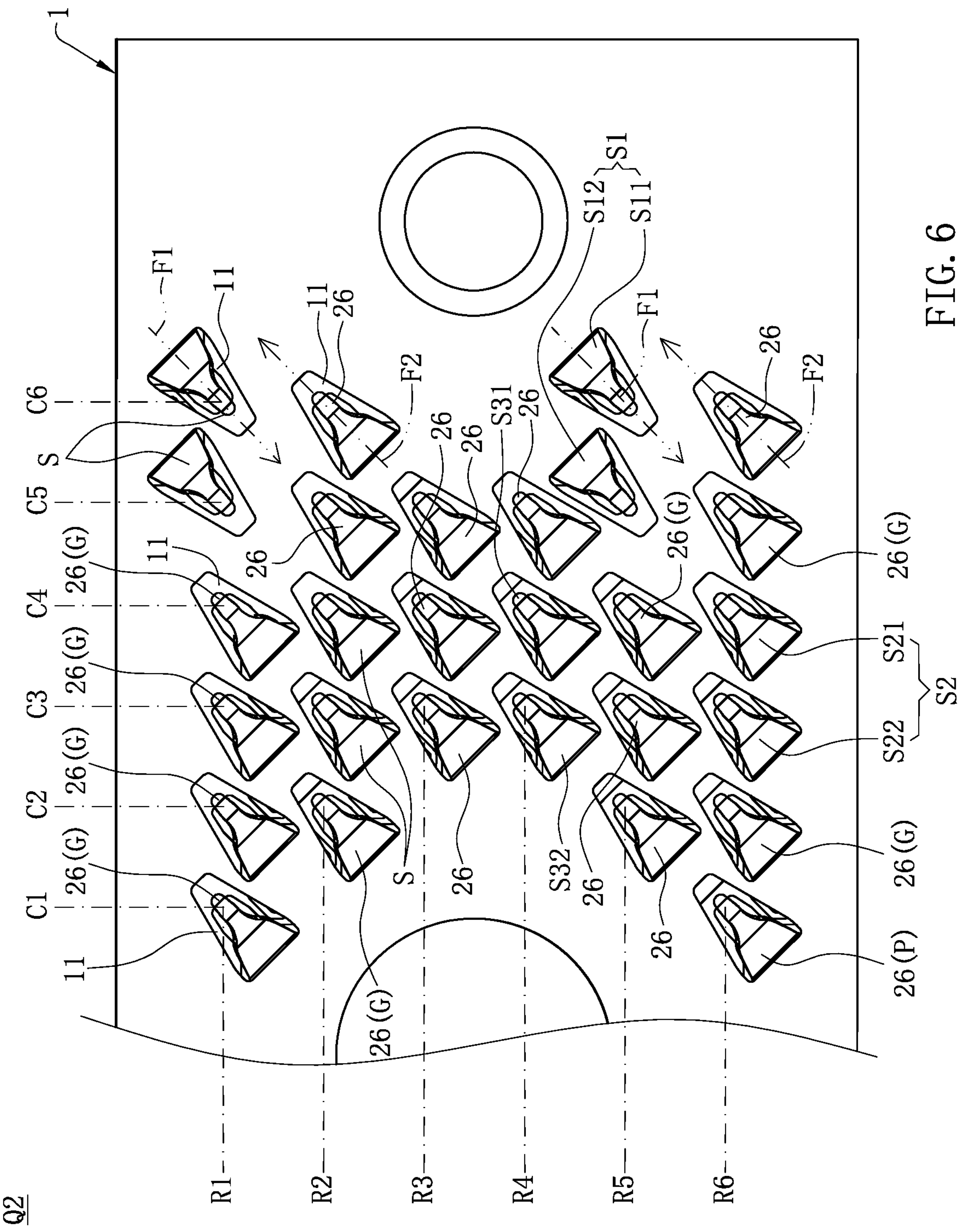
FIG. 6 is a partial top view of the electrical connector according to the first embodiment of the present invention.
Figure 7:
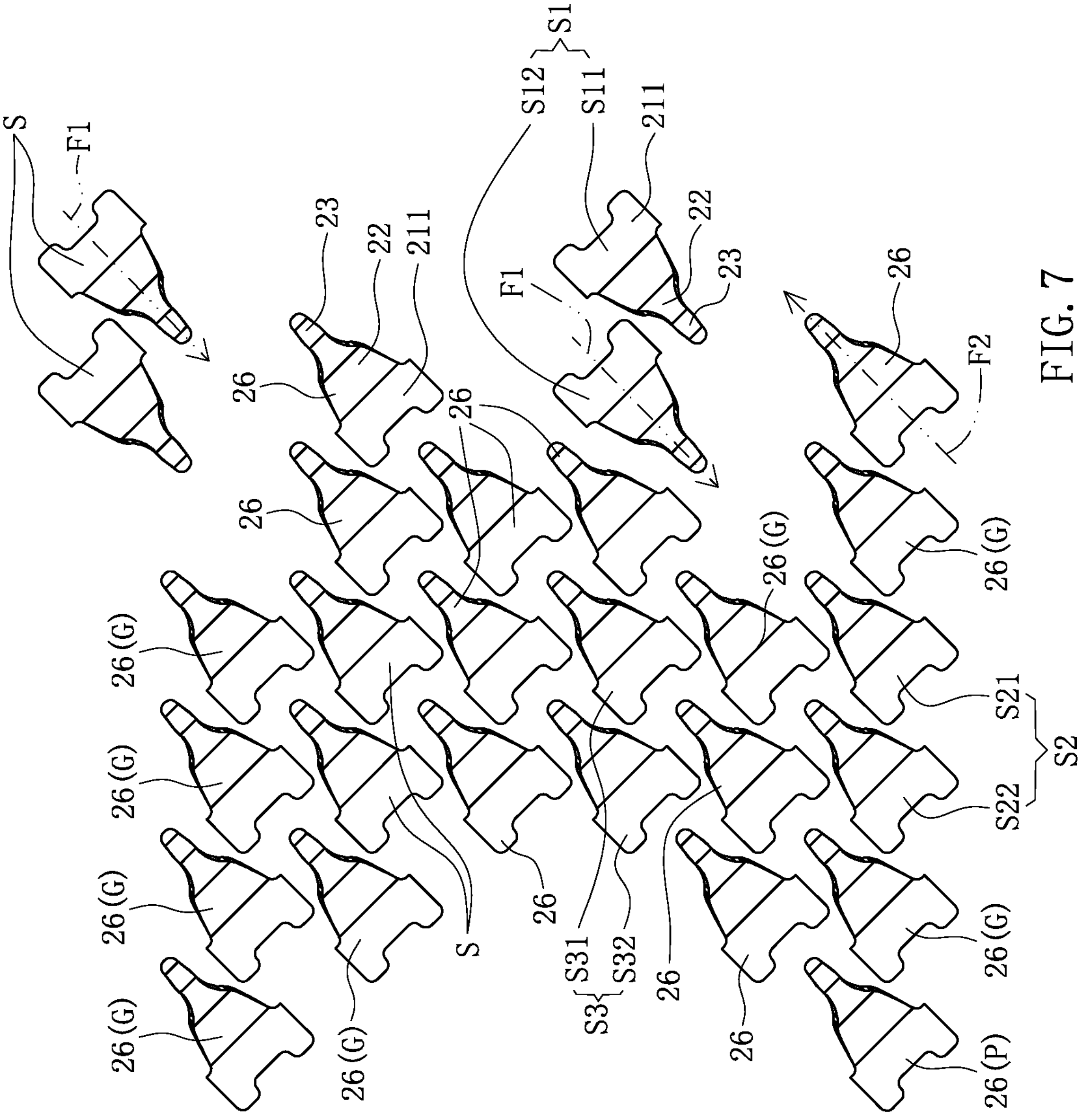
FIG. 7 is a schematic view of FIG. 6, where the insulating body of electrical connector is hidden.

Referring to FIG. 6 and FIG. 7, the terminals 2 in the second region Q2 include a plurality of pairs of differential terminals S, and each pair of differential terminals S has two terminals 2 provided to be adjacent to each other. The pairs of differential terminals S include a first pair of differential terminals S1, a second pair of differential terminals S2 and a third pair of differential terminals S3. The first pair of differential terminals S1 includes a first terminal S11 and a second terminal S12 provided to be adjacent to each other, and the pointing direction of the first terminal S11 and the pointing direction of the second terminal S12 are identical. The second pair of differential terminals S2 includes a third terminal S21 and a fourth terminal S22 provided to be adjacent to each other, and the pointing direction of the third terminal S21 and the pointing direction of the fourth terminal S22 are identical. The third pair of differential terminals S3 includes a fifth terminal S31 and a sixth terminal S32 provided to be adjacent to each other, and the pointing direction of the fifth terminal S31 and the pointing direction of the sixth terminal S32 are identical.

Referring to FIG. 6 and FIG. 7, viewing along the vertical direction, the pointing direction of the first terminal S11 and the pointing direction of the third terminal S21 are different from each other, and the base portion 21 of the first terminal S11 is located farther away from the base portion 21 of the third terminal S21 than the first contact portion 23 of the first terminal S11. It should be noted that "the base portion 21 of the first terminal S11 is located farther away from the base portion 21 of the third terminal S21 than the first contact portion 23 of the first terminal S11" refers to maintaining the location of the first contact portion 23 of the first terminal S11 unchanged, maintaining the first contact portion 23 of the first terminal S11 to be in contact with the corresponding first conductive portion of the first electrical component 200, and adjusting the location of the base portion 21 of the first terminal S11. In the present embodiment, since the terminal further includes the second contact portion 25 provided to be symmetrical to the first contact portion 23 along the vertical direction, similarly, viewing along the vertical direction, the base portion 21 of the first terminal S11 is located farther away from the base portion 21 of the third terminal S21 than the second contact portion 25 of the first terminal S11. In this case, the location of the second contact portion 25 of the first terminal S11 maintains unchanged, the second contact portion 25 of the first terminal S11 maintains being in contact with the corresponding second conductive portion of the second electrical component 300, and the location of the base portion 21 of the first terminal S11 is adjusted. It should be noted that, in other embodiments, the first contact portion 23 and the second contact portion 25 of each terminal 2 may be provided not to be symmetrical along the vertical direction, or each terminal 2 is provided with only the first contact portion 23 or only the second contact portion 25. Thus, it is possible that the base portion 21 of the first terminal S11 is located farther away from the base portion 21 of the third terminal S21 than one of the first contact portion 23 and the second contact portion 25. It should be understood that, since the first terminal S11 and the second terminal S12 are provided to be adjacent to each other and have the identical pointing direction, and the third terminal S21 and the fourth terminal S22 are provided to be adjacent to each other and have the identical pointing direction, in the present embodiment, the base portion 21 of the second terminal S12 is also located farther away from the base portion 21 of the fourth terminal S22 than one of the first contact portion 23 and the second contact portion 25 of the second terminal S12.

In the present embodiment of the present invention, the locations of the two first contact portions 23 of the first pair of differential terminals S1 may maintain unchanged, or the locations of the two second contact portions 25 of the first pair of differential terminals S1 may maintain unchanged. Further, the two base portions 21 of the first pair of differential terminals S1 may be located away from the two base portions 21 of the second pair of differential terminals S2. Thus, in the present embodiment of the present invention, the distances between the two base portions 21 of the first pair of the differential terminals S1 and the two base portions 21 of the second pair of differential terminals S2 are increased, thus reducing the mutual crosstalk between the first pair of differential terminals S1 and the second pair of differential terminals S2. Further, in the electrical connector 100, the location arrangements of the first contact portions 23 or the second contact portions 25 of the terminals 2 are unchanged, such that there is no need to adjust the locations of the first conductive portions of the first electrical component 200 or the second conductive portions 301 of the second electrical component 300, and the first electrical component 200 or the second electrical component 300 originally adopted may be directly used, thus enhancing the adaptability of the electrical connector 100. Meanwhile, compared to the solution of providing the shielding coating layer on the inner wall of each accommodating slot 11, in the present embodiment, the locations of the base portions 21 of the first terminal S11 and the second terminal S12 are adjusted, thus having a simple technique and reducing the production cost thereof.

Referring to FIG. 7, the pointing direction F1 of the first terminal S11 may be a direction being rotated by any feasible angle relative to the pointing direction F2 of the third terminal S21, as long as the pointing direction F1 of the first terminal S11 and the pointing direction F2 of the third terminal S21 are different, and compared to case where the pointing direction F1 of the first terminal S11 and the pointing direction F2 of the third terminal S21 are identical, a distance between the base portion 21 of the first terminal S11 and the base portion 21 of the third terminal S21 may be increased. In the present embodiment, the pointing direction F1 of the first terminal S11 and the pointing direction F2 of the third terminal S21 are parallel and opposite to each other. Thus, the distances between the two base portions 21 of the first pair of differential terminals S1 and the two base portions 21 of the second pair of differential terminals S2 may be increased to the maximum degree. Further, the first pair of differential terminals S1 are located at an edge location of a terminal 2 area formed by the terminals 2. For example, in the present embodiment, among the five terminals 2 having the first contact portions 23 located in the same row R5, the first terminal S11 and the second terminal S12 of the first pair of differential terminals S1 are located at the two locations at the extreme edges in the row R5. In other embodiments, the first terminal S11 and the second terminal S12 of the first pair of differential terminals S1 may be located at the two locations at the extreme edges in a same column. Alternatively, the first terminal S11 and the second terminal S12 of the first pair of differential terminals S1 may be located at the locations at the extreme edge of two respective rows. Alternatively, the first terminal S11 and the second terminal S12 of the first pair of differential terminals S1 may be located at the locations at the extreme edge of two respective columns. In the present embodiment of the present invention, by providing the first pair of differential terminals S1 at the edge location of the terminal 2 area, the location at periphery of the edge location without being provided with other terminals 2 may be utilized to provide a location adjusting space for the first pair of differential terminals S1.

Referring to FIG. 6 and FIG. 7, the two first contact portions 23 of the first pair of differential terminals S1 and the two first contact portions 23 of the second pair of differential terminals S2 are located in two adjacent rows (such as the adjacent rows R5 and R6 as shown in FIG. 6 and FIG. 7). The first contact portion 23 of the first terminal S11, the first contact portion 23 of the second terminal S12, the first contact portion 23 of the third terminal S21 and the first contact portion 23 of the fourth terminal S22 are located in four adjacent columns (such as the four adjacent columns of C3 to C6 as shown in FIG. 6). The pointing direction of the first terminal S11 and the pointing direction of the third terminal S21 are provided opposite to each other. Thus, the first pair of differential terminals S1 and the second pair of differential terminals S2 are completely staggered in their entireties in the row direction and the column direction, without any overlapping portions thereof, and the distances between the base portions of the two pairs of differential terminals S are further increased, thus more effectively reducing the crosstalk issue between the two pairs of differential terminals S. In addition, for the first pair of differential terminals S1 and the second pair of differential terminals S2 located in two adjacent rows, there is a greater effect of the crosstalk between the two pairs of differential terminals S of the electrical connector 100 in this application scenario, and the crosstalk issue between the two pairs of differential terminals S in this application scenario may be effectively reduced by the technical solutions of the present invention. It should be noted that the second contact portion 25 may be provided similar to the first contact portion 23 as described above, such that the two second contact portions 25 of the first pair of differential terminals S1 and the two second contact portions 25 of the second pair of differential terminals S2 are located in two adjacent rows, and the second contact portion 25 of the first terminal S11, the second contact portion 25 of the second terminal S12, the second contact portion 25 of the third terminal S21 and the second contact portion 25 of the fourth terminal S22 are located in four adjacent columns. Further, referring to FIG. 7, viewing along the column direction, projections of the first pair of differential terminals S1 and projections of the third pair of differential terminals S3 are completely staggered. Thus, viewing along the column direction, the first pair of differential terminals S1 are completely staggered simultaneously from the projections of the second pair of differential terminals S2 and the projections of the third pair of differential terminals S3, thus comprehensively considering the crosstalk issues between the first pair of differential terminals S1 and the second pair of differential terminals S2 as well as the third pair of differential terminals S3, and enhancing the signal transmission characteristics of the electrical connector 100.

Referring to FIG. 6 and FIG. 7, the terminals 2 in the second region Q2 further include N non-differential terminals 26, where N>1. The non-differential terminals 26 are terminals 2 not used to transmit differential signals, such as power terminals P, ground terminals G, detection terminals 2, etc. The first contact portion 23 of the third terminal S21 and the first contact portion 23 of the fourth terminal S22 and the first contact portions 23 of the non-differential terminals 26 are located in a same row (such as the row R6 as shown in FIG. 6), and in the row R6, the pointing direction of each non-differential terminal 26 and the pointing direction of the third terminal S21 are identical, which are the direction F2 as shown in FIG. 6 and FIG. 7. Similarly, the second contact portion 25 of the third terminal S21 and the second contact portion 25 of the fourth terminal S22 and the second contact portions 25 of the non-differential terminals 26 may be located in a same row. In the present embodiment, the pointing direction F2 of the third terminal S21 and the fourth terminal S22 of the second pair of differential terminals S2 and the pointing direction F2 of the non-signal terminals 2 in the same row maintain consistent, and only the pointing direction of the first terminal S11 and the second terminal S12 of the first pair of differential terminals S1 and the locations of the base portions 21 thereof are adjusted, which facilitates simplifying the design difficulties of the electrical connector 100. In the present embodiment, in the same row R6, the fourth terminal S22 and a ground terminal G are provided to be adjacent to each other along the row direction. In other embodiments, the pointing direction of the third terminal S21, the pointing direction of the first terminal S11 and the pointing direction of the non-differential terminals 26 may be all different, and the pointing directions of the terminals 2 at different locations may be adjusted comprehensively by comprehensively considering the interference strength of the terminals 2 at different locations.

Referring to FIG. 6 and FIG. 7, in the present embodiment, the first contact portion 23 of the third terminal S21 and the first contact portion 23 of the fifth terminal S31 are located in the same column (such as the column C4 as shown in the figures), and the first contact portion 23 of the fourth terminal S22 and the first contact portion 23 of the sixth terminal S32 are located in the same column. The N non-differential terminals 26 have two non-differential terminals 26 (such as the two non-differential terminals 26 located in the row R5 and respectively located in the columns C3, C4 as shown in FIG. 6) located between the second pair of differential terminals S2 and the third pair of differential terminals S3 along the column direction. The pointing direction of the third terminal S21, the pointing direction of the fifth terminal S31 and the pointing direction of each of the non-differential terminals 26 located between the second pair of differential terminals S2 and the third pair of differential terminals S3 are identical, and are all the direction F2. It should be noted that, similarly, the second contact portion 25 of the third terminal S21 and the second contact portion 25 of the fifth terminal S31 may be located in the same column, and the second contact portion 25 of the fourth terminal S22 and the second contact portion 25 of the sixth terminal S32 may be located in the same column. Thus, viewing along the column direction, the second pair of differential terminals S2 and the third pair of differential terminals S3 are aligned and isolated in their entireties by the two non-differential terminals 26 located between the second pair of differential terminals S2 and the third pair of differential terminals S3, thus reducing the mutual crosstalk between the second pair of differential terminals S2 and the third pair of differential terminals S3.

Referring to FIG. 3, FIG. 4 and FIG. 7, each terminal 2 has a first body 2A and a second body 2B. The first body 2A has a first body portion 211 and the first extending arm 22 extending from the first body portion 211, and the second body 2B has a second body portion 212 and the second extending arm 24 extending from the second body portion 212. A plate surface of the first body portion 211 and a plate surface of the second body portion 212 are provided opposite to and in contact with each other along the vertical direction. Thus, the first body portion 211 and the second body portion 212 are in communication with each other, and the base portion 21 of each terminal 2 includes the first body portion 211 and the second body portion 212. The first bodies 2A of the terminals 2 located in the second region Q2 are formed by cutting and punching a single-sheet material. Thus, by cutting the first bodies 2A of the terminals 2, the pointing directions of the terminals 2 may be confirmed. That is, during the cutting, the first bodies 2A of the terminals 2 with different arrangement angles are directly cut, allowing the terminals 2 to be simultaneously fixed on the insulating body 1, without the need to, after the terminals 2 are formed, twist the arrangement angle of each terminal 2 and place the terminals in the corresponding accommodating slots 11, thus confirming the pointing directions of the terminals 2. Thus, the present embodiment of the present invention is convenient for facilitating processing and enhancing the feasibility thereof. Specifically, the first bodies 2A of the terminals 2 may be simultaneously cut in the single-sheet material by laser cutting or knife cutting, and the first body portion 211, the first extending arm 22 and the first contact portion 23 provided in the first extending arm 22 may be formed in each first body 2A by the punching step. The second body 2B may be formed by a similar method. Then, the plate surface of the first body portion 211 and the plate surface of the second body portion 212 are in contact and fixed by fixing methods such as adhesive attaching or soldering. Further, to further simplify the processing steps, all of the terminals 2 in the two regions may be formed altogether by cutting and punching the single-sheet material.

In other embodiments, the base portion 21 of each terminal 2 may be an integral structure to be connected simultaneously to the first extending arm 22 and the second extending arm 24, and each terminal is in an integral sheet structure. For example, the base portions 21 and the first extending arms 22 (or the second extending arms 24) of the terminals 2 located in the same region are formed by cutting and punching the single-sheet material, and the base portion 21 of each terminal 2 has two plate surfaces provided opposite to each other along the vertical direction. Thus, the two plate surfaces face the vertical direction, and the base portion 21 is not in a vertical shape extending vertically along the vertical direction. Similarly, the pointing directions of the terminals 2 may be confirmed during the cutting.

Figure 8:
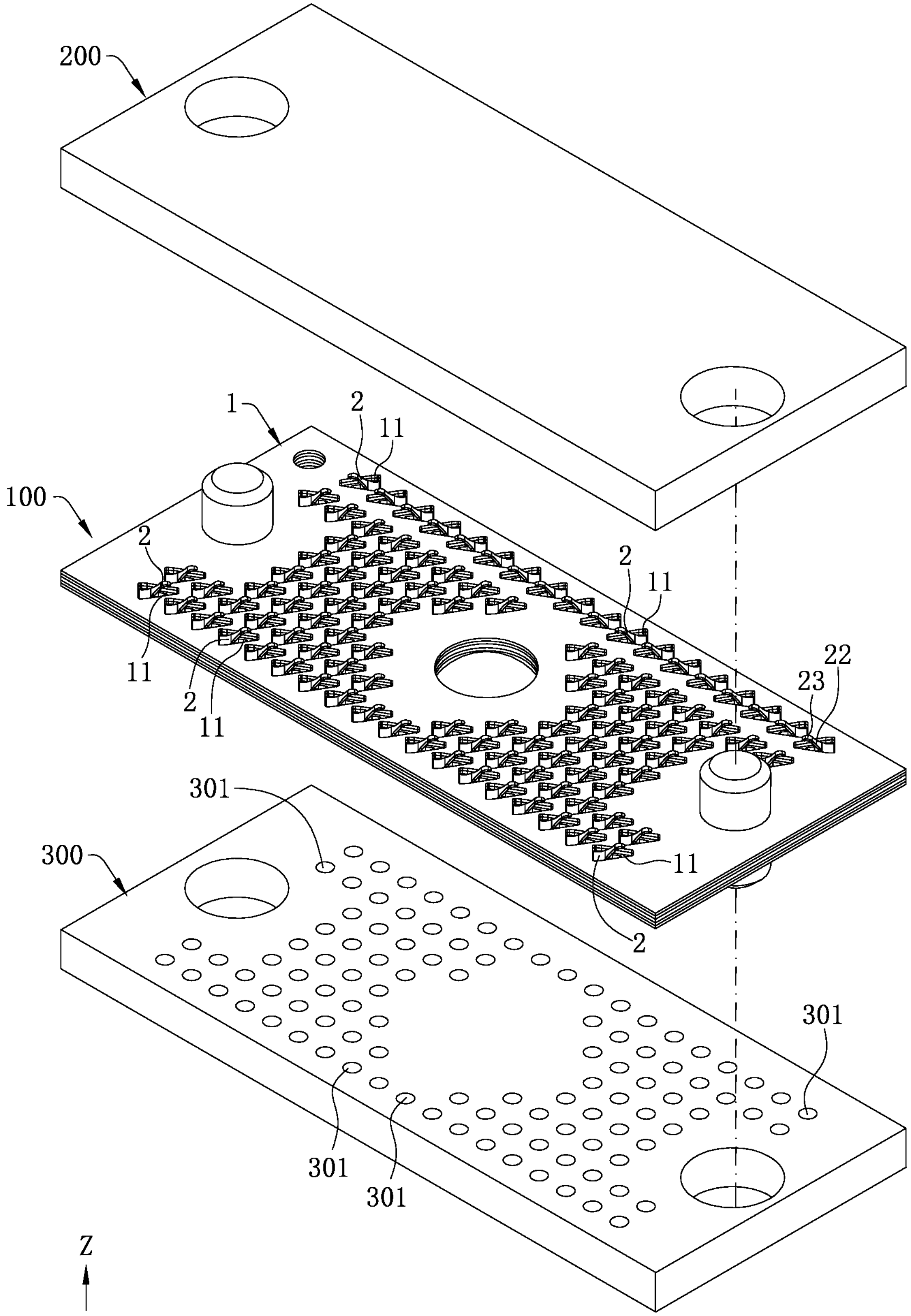
FIG. 8 is a perspective schematic view of an electrical connector, a first electrical component and a second electrical component according to a second embodiment of the present invention.
Figure 9:
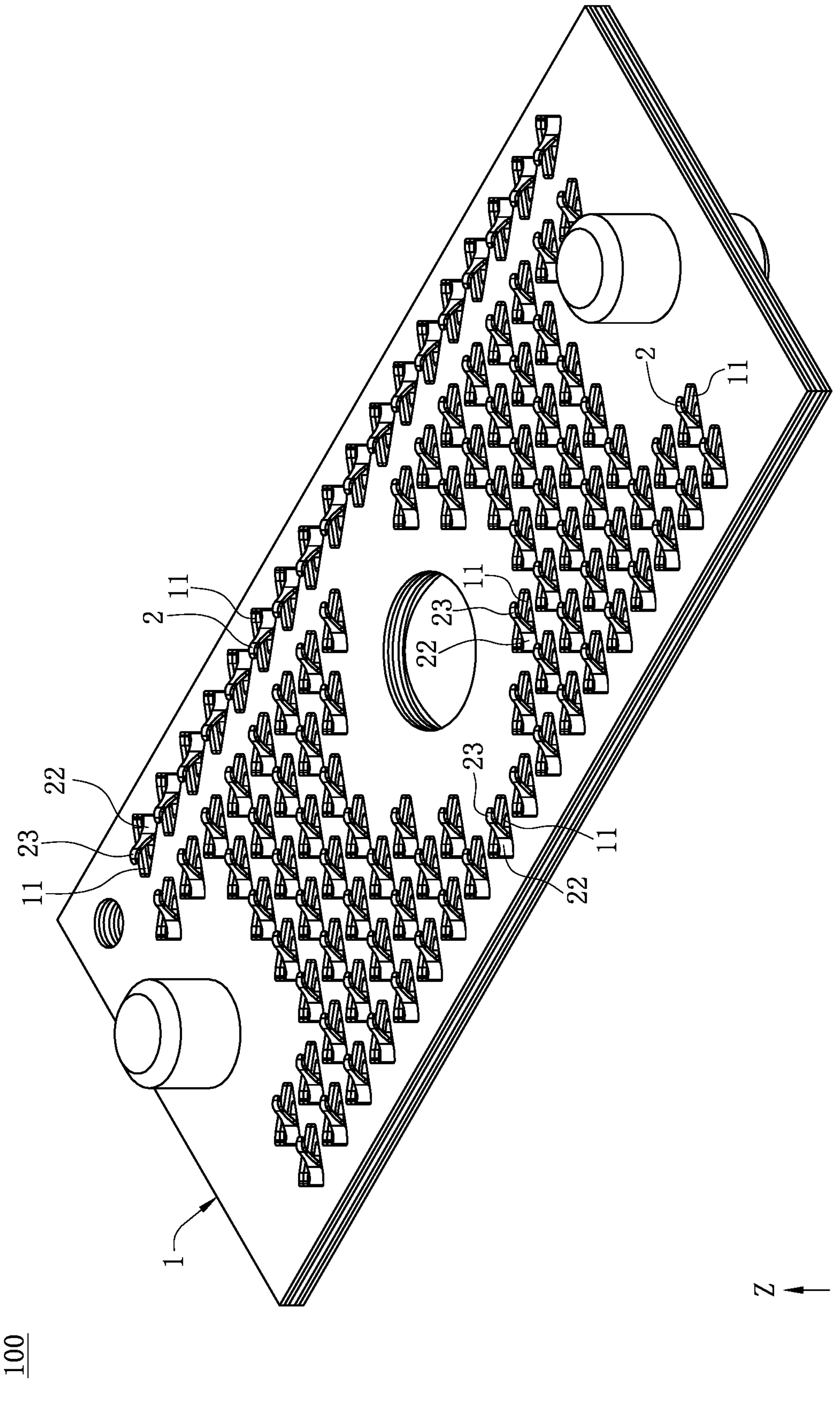
FIG. 9 is a perspective schematic view of the electrical connector according to the second embodiment of the present invention.

Referring to FIG. 8 and FIG. 9, an electrical connector 100 is provided according to the second embodiment of the present invention. Similar to the first embodiment, the electrical connector 100 in the second embodiment is connected between a first electrical component 200 and a second electrical component 300 along the vertical direction. The electrical connector 100 includes an insulating body 1 and a plurality of terminals 2 fixed to the insulating body 1. The insulating body 1 is provided with two regions, that is, a first region Q1 and a second region Q2, and each region is provided with a plurality of accommodating slots 11 to accommodate the terminals 2. In other embodiments, the insulating body 1 may be provided with only one region or more than two regions, without being limited thereto. The structures of the terminals 2 in the second embodiment are similar to the structures of the terminals 2 in the first embodiment. Each terminal 2 includes a base portion 21, a first extending arm 22 extending from the base portion 21, a second extending arm 24 extending from the base portion 21, a first contact portion 23 provided on the first extending arm 22 to be in contact with the first electrical component 200 and a second contact portion 25 provided on the second extending arm 24 to be in contact with the second electrical component 300. Further, referring to the first embodiment, viewing along the vertical direction, a direction from the first reference point of the base portion 21 toward the second reference point of the first contact portion 23 is defined as a pointing direction corresponding to each terminal 2, or a direction from the first reference point of the base portion 21 toward the second reference point of the second contact portion 25 is defined as a pointing direction corresponding to each terminal 2. In the second embodiment, the terminals 2 are in two pointing directions F1 and F2.

Figure 10:
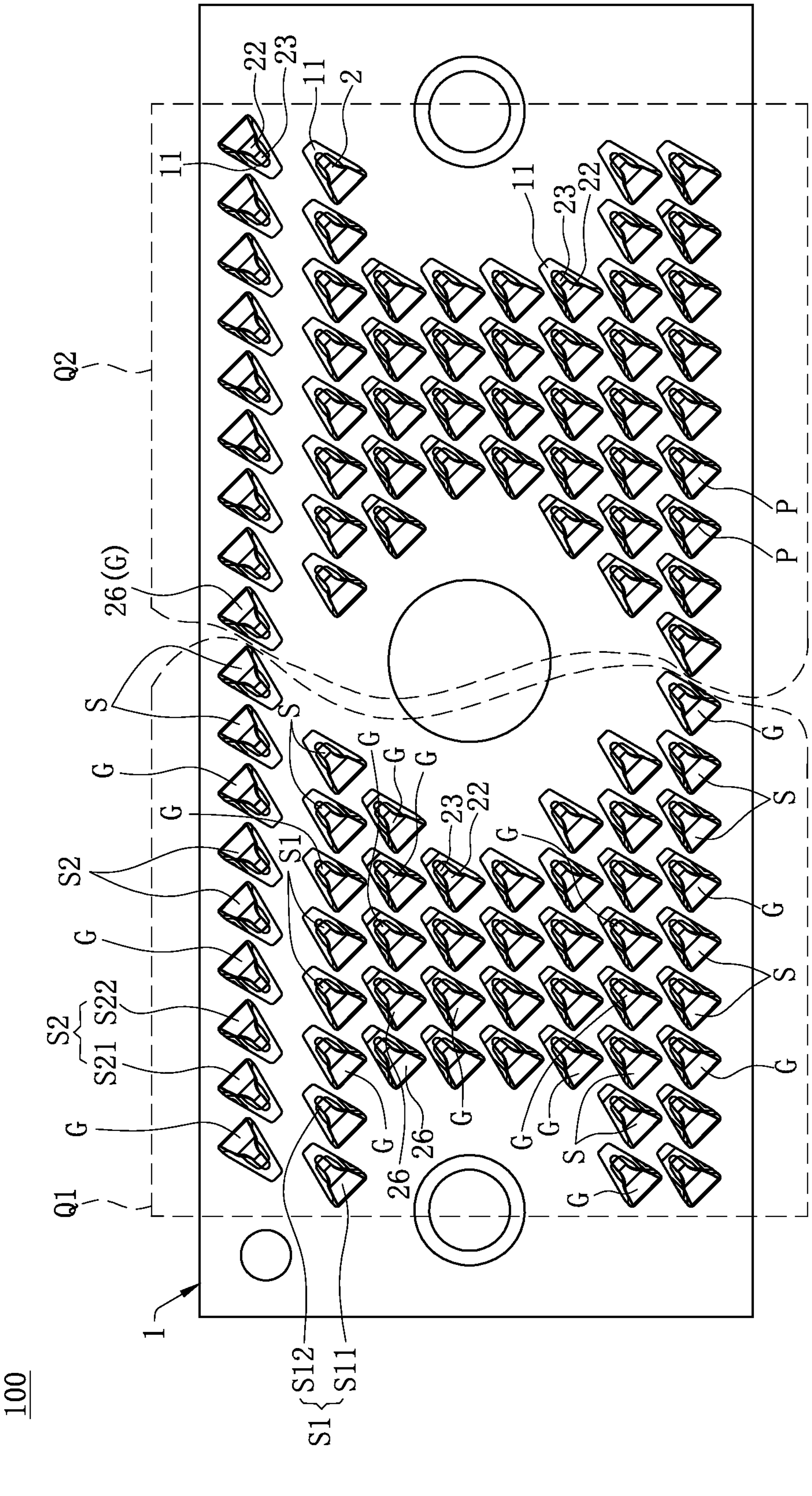
FIG. 10 is a top view of the electrical connector according to the second embodiment of the present invention.
Figure 11:
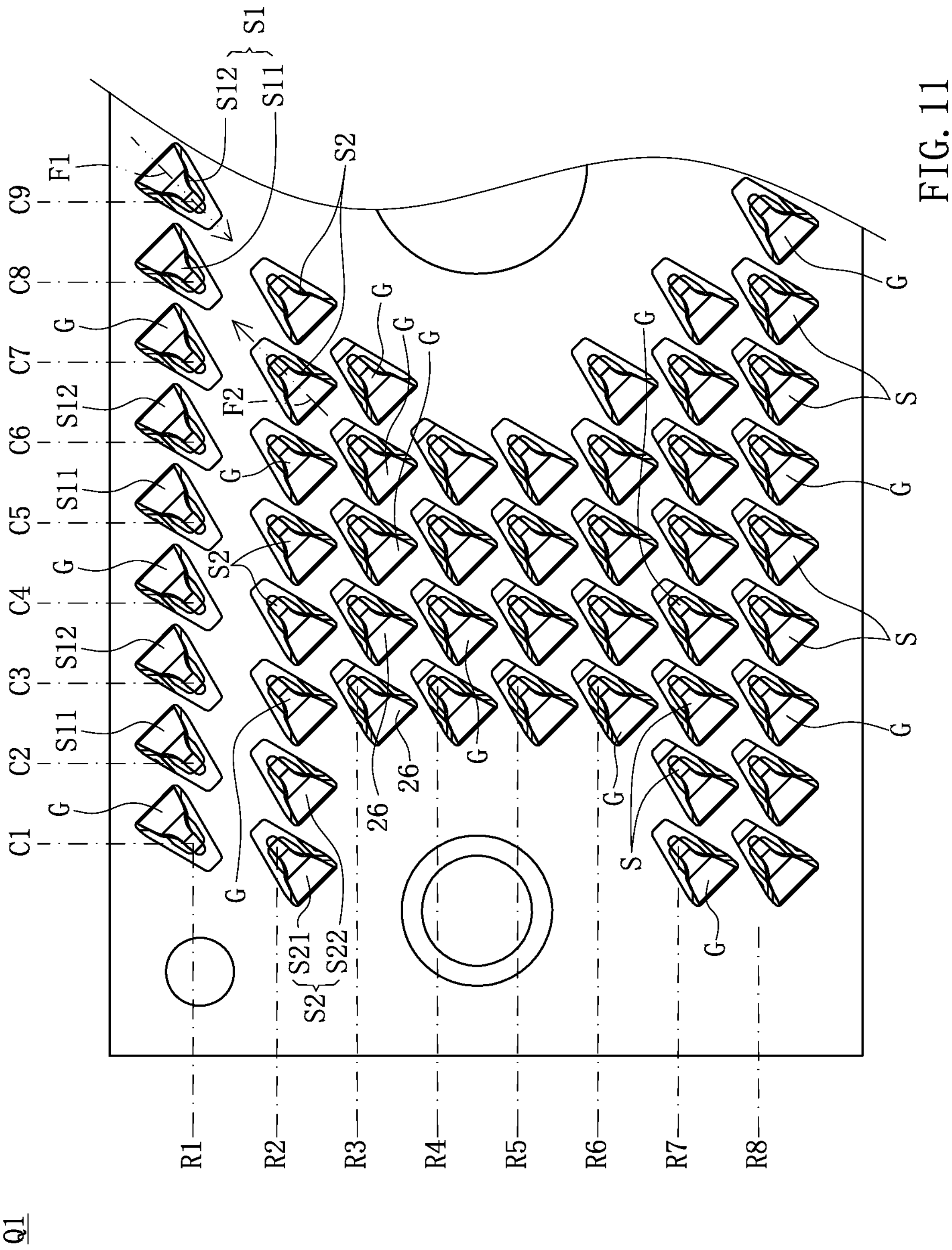
FIG. 11 is a partial top view of the electrical connector according to the second embodiment of the present invention.

Referring to FIG. 10 and FIG. 11, for the terminals 2 in the same region, the first contact portions 23 of the terminals 2 are arranged in the region in a plurality of rows and a plurality of columns based on a constant first row distance and a constant first column distance, and the second contact portions 25 of the terminals 2 are arranged in the region in a plurality of rows and a plurality of columns based on a constant second row distance and a constant second column distance. The first electrical component 200 has a plurality of first conductive portions (not illustrated, same below) to be in contact with the first contact portions 23 of the terminals 2, and the second electrical component 300 has a plurality of second conductive portions 301 to be in contact with the second contact portions 25 of the terminals 2.

Figure 12:
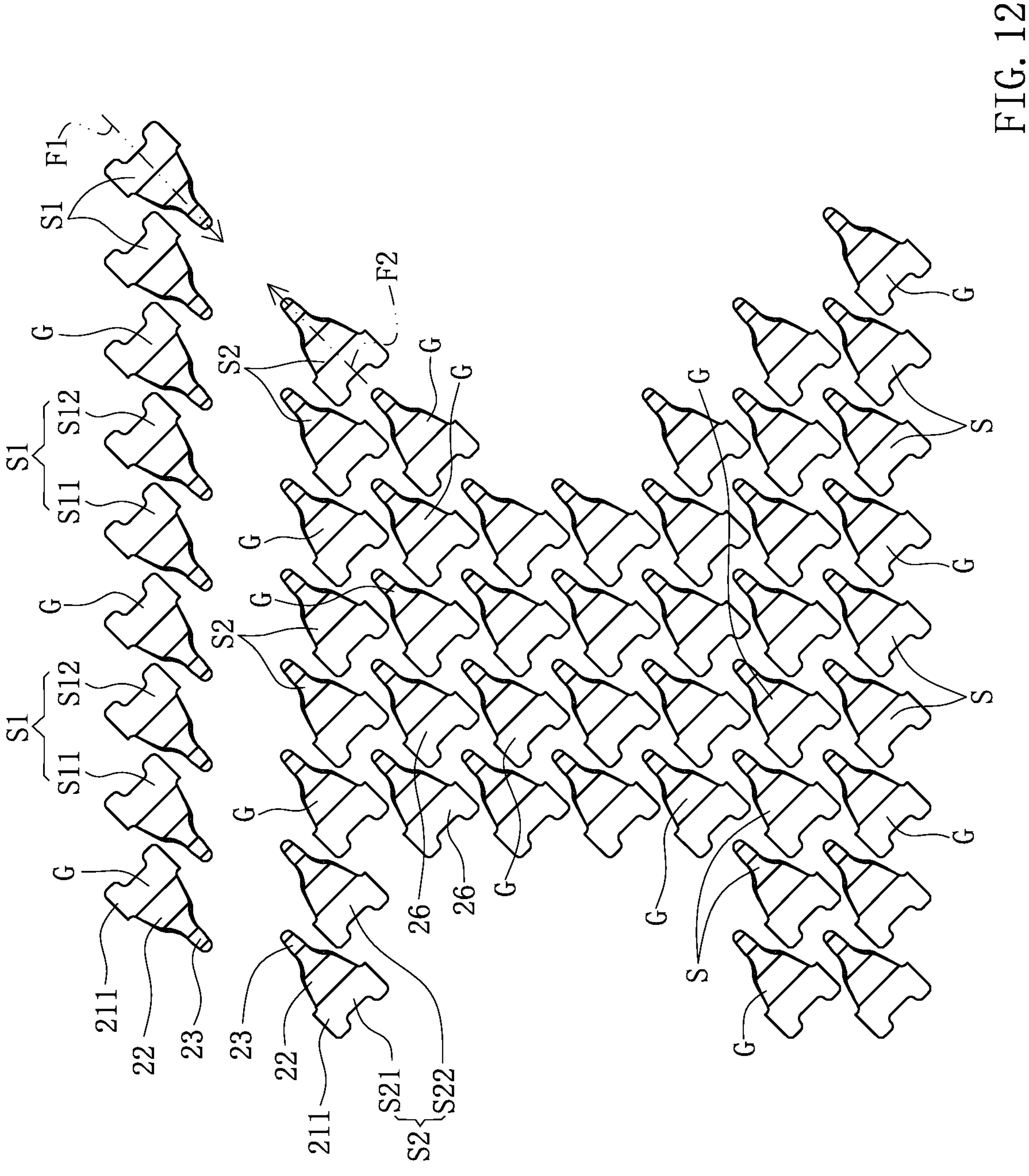
FIG. 12 is a schematic view of FIG. 6, where the insulating body of electrical connector is hidden.

Referring to FIG. 11 and FIG. 12, the terminals 2 in the same region include a plurality of pairs of differential terminals S, and each pair of differential terminals S has two terminals 2 provided to be adjacent to each other. The pairs of differential terminals S include a plurality of first pairs of differential terminals S1 and a plurality of second pairs of differential terminals S2. Each first pair of differential terminals S1 includes a first terminal S11 and a second terminal S12 provided to be adjacent to each other, and the pointing direction of the first terminal S11 and the pointing direction of the second terminal S12 are identical. Each second pair of differential terminals S2 includes a third terminal S21 and a fourth terminal S22 provided to be adjacent to each other, and the pointing direction of the third terminal S21 and the pointing direction of the fourth terminal S22 are identical.

Referring to FIG. 11 and FIG. 12, viewing along the vertical direction, the pointing direction F1 of the first terminal S11 and the pointing direction F2 of the third terminal S21 are different from each other, and the base portion 21 of the first terminal S11 is located farther away from the base portion 21 of the third terminal S21 than the first contact portion 23 or the second contact portion 25 of the first terminal S11. It should be understood that the first terminal S11 and the second terminal S12 are provided to be adjacent to each other and have the identical pointing direction, which is the direction F1; and the third terminal S21 and the fourth terminal S22 are provided to be adjacent to each other and have the identical pointing direction, which is the direction F2. In the present embodiment, the base portion 21 of the second terminal S12 is also located farther away from the base portion 21 of the fourth terminal S22 than one of the first contact portion 23 and the second contact portion 25 of the second terminal S12. Thus, in the present embodiment of the present invention, the distances between the two base portions 21 of the first pair of the differential terminals S1 and the two base portions 21 of the second pair of differential terminals S2 are increased, thus reducing the mutual crosstalk between the first pair of differential terminals S1 and the second pair of differential terminals S2. Further, in the present embodiment, the locations of the two first contact portions 23 of the first pair of differential terminals S1 maintain unchanged, or the locations of the two second contact portions 25 of the first pair of differential terminals S1 maintain unchanged, such that there is no need to adjust the locations of the first conductive portions of the first electrical component 200 or the second conductive portions 301 of the second electrical component 300, and the first electrical component 200 or the second electrical component 300 originally adopted may be directly used, thus enhancing the adaptability of the electrical connector 100. Meanwhile, compared to the solution of providing the shielding coating layer on the inner wall of each accommodating slot 11, the present embodiment has a simple technique and reduces the production cost thereof. It should be noted that the beneficial effects in the second embodiment are similar to the beneficial effects in the first embodiment, and is merely described hereafter in a simplified way, without further elaborated in details.

The pointing direction F1 of the first terminal S11 may be a direction being rotated by any feasible angle relative to the pointing direction F2 of the third terminal S21, as long as the pointing direction of the first terminal S11 and the pointing direction of the third terminal S21 are different, and compared to case where the pointing direction F1 of the first terminal S11 and the pointing direction F2 of the third terminal S21 are identical, in the present embodiment, a distance between the base portion 21 of the first terminal S11 and the base portion 21 of the third terminal S21 may be increased. Referring to FIG. 12, in the present embodiment, the pointing direction F1 of the first terminal S11 and the pointing direction F2 of the third terminal S21 are parallel and opposite to each other. Thus, the distances between the two base portions 21 of the first pair of differential terminals S1 and the two base portions 21 of the second pair of differential terminals S2 may be increased to the maximum degree. Further, the first pair of differential terminals S1 are located at an edge location of a terminal 2 area formed by the terminals 2, and the location at periphery of the edge location without being provided with other terminals 2 may be utilized to provide a location adjusting space for the first pair of differential terminals S1.

Referring to FIG. 11 and FIG. 12, the terminals 2 in one of the regions further include M non-differential terminals 26, where M>1. The non-differential terminals 26 are terminals 2 not used to transmit differential signals, such as power terminals P, ground terminals G, detection terminals, etc. The first contact portion 23 of the third terminal S21 and the first contact portion 23 of the fourth terminal S22 and the first contact portions 23 of the non-differential terminals 26 are located in a same row (such as the row R1 as shown in FIG. 11), and in the row R1, the pointing direction of each non-differential terminal 26 and the pointing direction of the third terminal S21 are identical. Similarly, the second contact portion 25 of the third terminal S21 and the second contact portion 25 of the fourth terminal S22 and the second contact portions 25 of the non-differential terminals 26 may be located in a same row. In the present embodiment, a ground terminal G exists between two adjacent first pairs of differential terminals S1, and a ground terminal G exists between two adjacent second pairs of differential terminals S2.

The structures of the terminals 2 in the second embodiment are similar to those in the first embodiment. Referring to FIG. 3 and FIG. 4, each terminal 2 has a first body 2A and a second body 2B. The first body 2A has a first body portion 211 and the first extending arm 22 extending from the first body portion 211, and the second body 2B has a second body portion 212 and the second extending arm 24 extending from the second body portion 212. A plate surface of the first body portion 211 and a plate surface of the second body portion 212 are provided opposite to and in contact with each other along the vertical direction. Thus, the first body portion 211 and the second body portion 212 are in communication with each other, and the base portion 21 of each terminal 2 includes the first body portion 211 and the second body portion 212. The first bodies 2A of the terminals 2 located in the second region Q2 are formed by cutting and punching a single-sheet material, and similarly, it is convenient for facilitating processing and enhancing the feasibility thereof. In the second embodiment, the terminals 2 in the first region Q1 and the terminals 2 in the second region Q2 are provided with the first pairs of differential terminals S1, the second pairs of differential terminals S2, and the non-differential terminals 26 symmetrically. In other embodiments, the first pairs of differential terminals S1, the second pairs of differential terminals S2, and the non-differential terminals 26 in the first region Q1 and the second region Q2 may be distributed asymmetrically, which may be adjusted according to actual needs.

Figure 13:
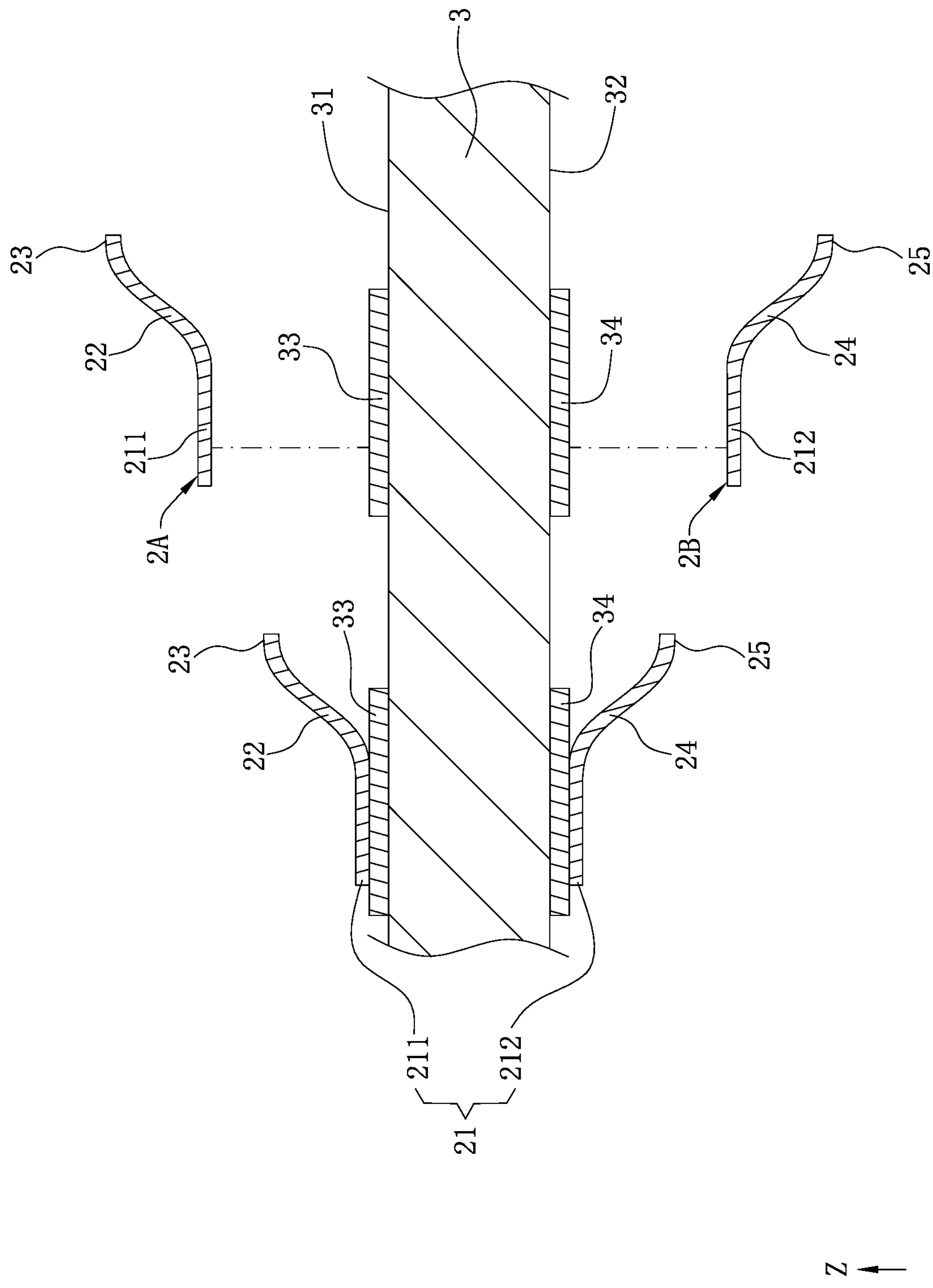
FIG. 13 is a partial sectional view of a conductive plate and a terminal in an electrical connector according to a third embodiment of the present invention.
Figure 14:
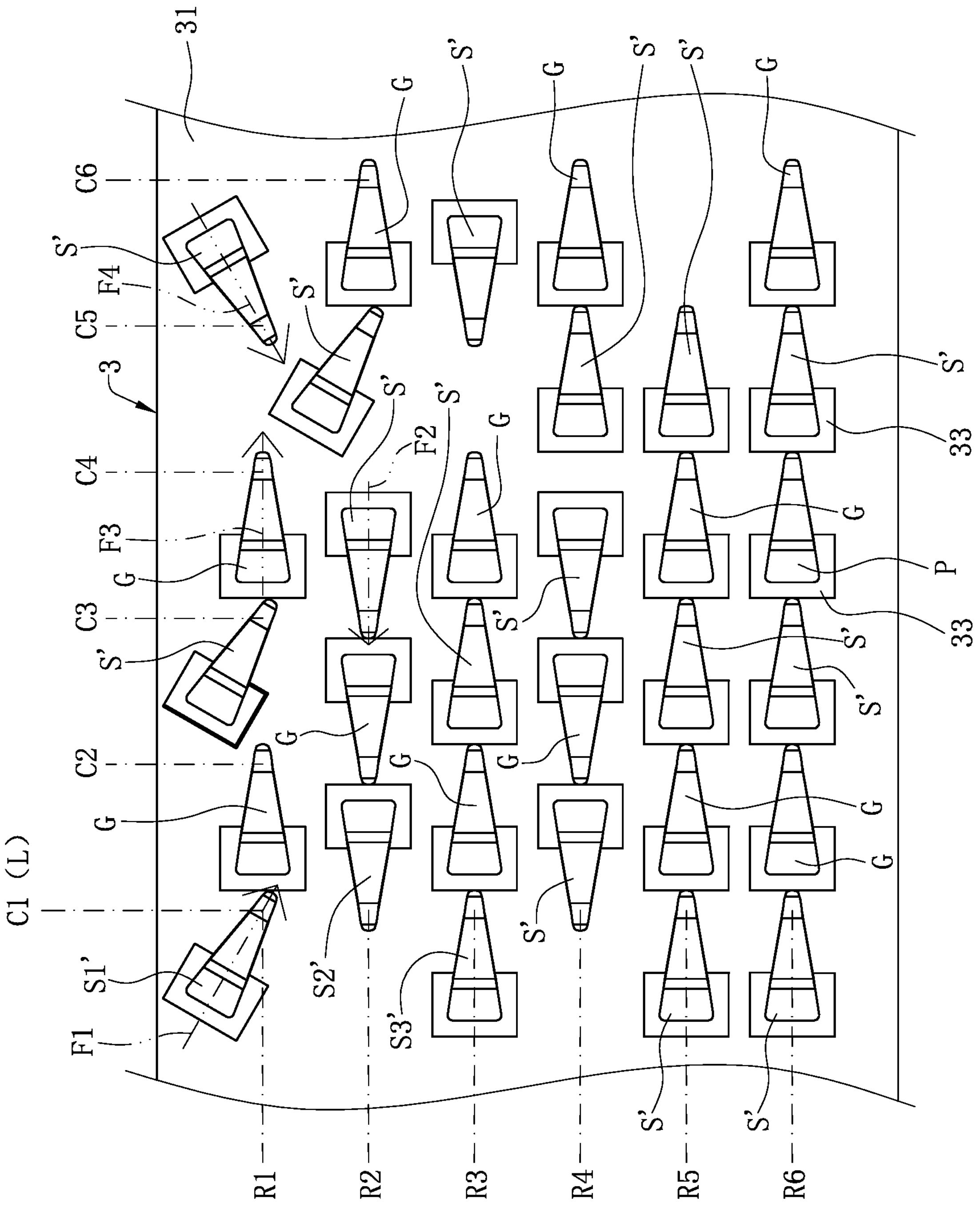
FIG. 14 is a partial top view of the electrical connector according to the third embodiment of the present invention.

Referring to FIG. 13 and FIG. 14, an electrical connector is provided according to the third embodiment of the present invention, where the accompanying drawings illustrate only a portion of the electrical connector in the third embodiment. Similar to the first embodiment, the electrical connector in the third embodiment is connected between a first electrical component and a second electrical component along a vertical direction Z. The electrical connector includes an insulating body (not illustrated, same below) and a plurality of terminals 2 fixed to the insulating body. The insulating body is provided with two regions (not illustrated, same below), that is, a first region and a second region, and each region is provided with a plurality of accommodating slots (not illustrated, same below) to accommodate the terminals 2. In other embodiments, the insulating body may be provided with only one region or more than two regions, without being limited thereto. One of the differences between the third embodiment and the first embodiment exists in that the electrical connector according to the third embodiment further includes a conductive plate 3. The conductive plate 3 has a first surface 31 and a second surface 32 provided opposite to each other along the vertical direction Z. The first surface 31 of the conductive plate 3 has a plurality of first conductive portions 33, and the second surface 32 of the conductive plate 3 has a plurality of second conductive portions 34. The first conductive portions 33 are electrically connected to the second conductive portions 34 respectively. In the third embodiment, each terminal 2 includes a first body 2A and a second body 2B (not illustrated, same below). The first body 2A has a first body portion 211 and the first extending arm 22, and the first contact portion 23 provided on the first extending arm 22. The second body 2B has a second body portion 212 and the second extending arm 24, and the second contact portion 25 provided on the second extending arm 24. The first contact portion 23 is used to be in upward contact with the first electrical component, and the second contact portion 25 is used to be in downward contact with the second electrical component. Each terminal 2 has a base portion 21, and the base portion 21 includes the first body portion 211 and the second body portion 212. A plate surface of the first body portion 211 of the first body 2A is fixed to a corresponding first conductive portion 33 of the first surface 31 of the conductive plate 3, and a plate surface of the second body portion 212 of the second body 2B is fixed to a corresponding second conductive portion 34 of the second surface 32 of the conductive plate 3. In other words, in the first embodiment and the second embodiment, the first body 2A and the second body 2B of each terminal 2 are fixed to each other by methods such as adhesive attaching or soldering to facilitate the electrical connection, and in the third embodiment, the first body 2A and the second body 2B of each terminal 2 are conductively connected indirectly by the conductive plate 3. The structure of the first body 2A in the third embodiment is similar to the structure of the first body 2A in the first embodiment, and the structure of the second body 2B in the third embodiment is similar to the structure of the second body 2B in the first embodiment. In the third embodiment, the first body 2A and the second body 2B are provided symmetrically along the vertical direction Z. Similarly, viewing along the vertical direction Z, a direction from the first reference point of the base portion 21 toward the second reference point of the first contact portion 23 or the second contact portion 25 is defined as a pointing direction corresponding to each terminal 2. The terminals 2 as shown in FIG. 14 are located in a same region. The first contact portions 23 of the terminals 2 are arranged in the region in a plurality of rows and a plurality of columns (such as the rows R1~R6 and the columns C1~C6 as shown in FIG. 14 and FIG. 15) based on a constant first row distance and a constant first column distance, and the second contact portions 25 of the terminals 2 are arranged in the region in a plurality of rows and a plurality of columns based on a constant second row distance and a constant second column distance.

Referring to FIG. 14, the terminals 2 located in the same region include a plurality of signal terminals S' and a plurality of non-signal terminals S', and the non-signal terminals S' include a plurality of ground terminals G and a plurality of power terminals P. In the present embodiment, the two signal terminals S' located in the column C1 and respectively in the rows R5, R6 are used to transmit a pair of differential signals, and the signal terminals S' located in the column C5 and respectively in the rows R5, R6 are used to transmit another pair of differential signals. The signal terminals S' at other locations are used to transmit single-ended signals. In other embodiments, the signal being transmitted by each signal terminal S' may be provided according to actual needs. Similar to the first embodiment, in the third embodiment, each terminal 2 is defined with a corresponding pointing direction. For example, FIG. 14 shows that the terminals 2 have four pointing directions F1, F2, F3 and F4.

It should be noted that, for convenience of describing the technical solutions of the present embodiment in conjunction with the accompanying drawings, in the following descriptions, an example is provided using the signal terminal S' located in the column C1 and the row R1 as a first signal terminal S1', the signal terminal S' located in the column C1 and the row R2 as a second signal terminal S2', and the signal terminal S' located in the column C1 and the row R3 as a third signal terminal S3' in order to describe the technical solutions.

Figure 15:
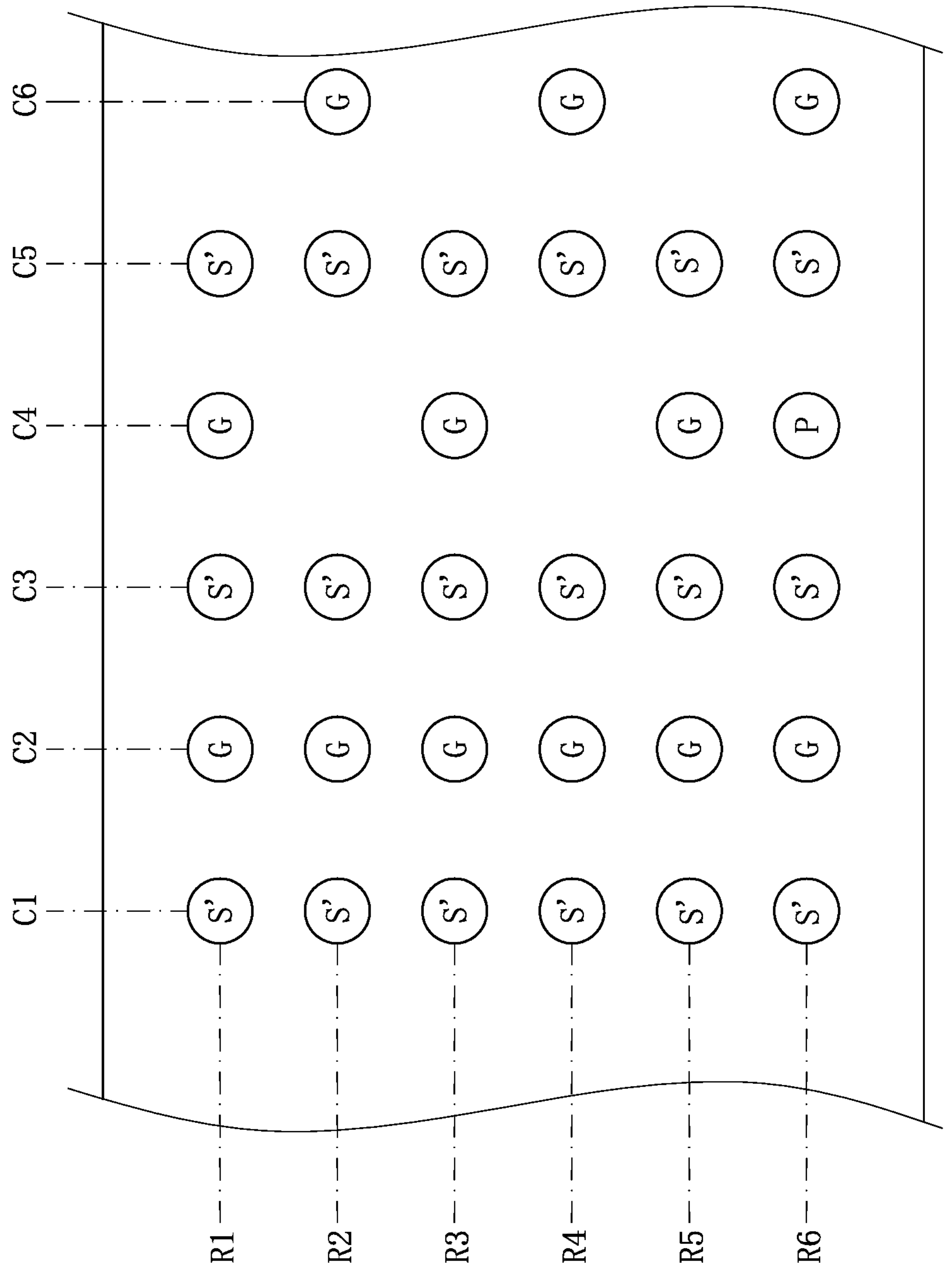
FIG. 15 is a simplified schematic view of the arrangement locations of the first contact portions of the terminals of FIG. 14.

Referring to FIG. 14 and FIG. 15, viewing along the vertical direction Z, the pointing direction F1 of the first signal terminal S1' and the pointing direction F2 of the second signal terminal S2' are different from each other, and the base portion 21 of the first signal terminal S1' is located farther away from the base portion 21 of the second signal terminal S2' than the first contact portion 23 of the first signal terminal S1'. It is also possible that the base portion 21 of the first signal terminal S1' is located farther away from the base portion 21 of the second signal terminal S2' than the second contact portion 25 of the first signal terminal S1'. Thus, in the present embodiment of the present invention, the distance between the base portion 21 of the first signal terminal S1' and the base portion 21 of the second signal terminal S2' are increased, thus reducing the mutual crosstalk between the first signal terminal S1' and the second signal terminal S2'. Further, since the base portion 21 of the first signal terminal S1' is located farther away from the base portion 21 of the second signal terminal S2' than the first contact portion 23 or the second contact portion 25 of the first signal terminal S1', the location of the first contact portion 23 of the first signal terminal S1' maintains unchanged, or the location of the second contact portion 25 of the first signal terminal S1' maintains unchanged, such that there is no need to adjust the locations of the first conductive portions of the first electrical component or the second conductive portions of the second electrical component, and the first electrical component and the second electrical component originally adopted may be directly used, thus enhancing the adaptability of the electrical connector. Meanwhile, compared to the solution of providing the shielding coating layer on the inner wall of each accommodating slot, the present embodiment has a simple technique and reduces the production cost thereof. It should be noted that the beneficial effects in the third embodiment are similar to the beneficial effects in the first embodiment, and is merely described hereafter in a simplified way, without further elaborated in details. It should be noted that, in the present embodiment, the first signal terminal S1' and the second signal terminal S2' both transmit single-ended signals, such as transmitting single-ended high frequency signals. In other embodiments, the first signal terminal S1' may transmit a positive signal or a negative signal of a pair of differential signals, and the second signal terminal S2' may transmit the positive signal or the negative signal of another pair of differential signals.

Referring to FIG. 14, in the ground terminals G, at least one ground terminal G and the second signal terminal S2' are provided to be adjacent to each other, and the pointing direction F2 of the second signal terminal S2' and the pointing direction F2 of the ground terminal G provided to be adjacent to the second signal terminal S2' are identical. Thus, the ground terminal G shields certain signal interferences for the second signal terminal S2'. The terminals 2 further include a third signal terminal S3', and the pointing directions of the first signal terminal S1', the second signal terminal S2' and the third signal terminal S3' are different, and are respectively F1, F2 and F3. The base portions 21 of the first signal terminal S1', the second signal terminal S2' and the third signal terminal S3' are away from one another, and the first signal terminal S1', the second signal terminal S2' and the third signal terminal S3' are all used to transmit single-ended signals. Thus, the effects of crosstalk among the three signal terminals S' are comprehensively considered, thus reducing the crosstalk between the first signal terminal S1', the second signal terminal S2' and the third signal terminal S3', and more effectively improving the overall signal transmission characteristics of the electrical connector.

Referring to FIG. 14 and FIG. 15, viewing along the vertical direction Z, the first contact portion 23 of the first signal terminal S1' and the first contact portion 23 of the second signal terminal S2' are located in a straight line L of a same column, and the base portion 21 of the first signal terminal S1' and the base portion 21 of the second signal terminal S2' are respectively located at two sides of the straight line L. Thus, compared to the case where the base portion 21 of the first signal terminal S1' and the base portion 21 of the second signal terminal S2' are located at a same side of the straight line L, the present embodiment may increase a greater distance between the base portion 21 of the first signal terminal S1' and the base portion 21 of the second signal terminal S2', thus more effectively reducing the crosstalk between the first signal terminal S1' and the second signal terminal S2'. Further, viewing along the vertical direction Z, the first contact portion 23 of the first signal terminal S1', the first contact portion 23 of the second signal terminal S2' and the first contact portion 23 of the third signal terminal S3' are all located in the straight line L, the first contact portion 23 of the first signal terminal S1' is located between the first contact portion 23 of the second signal terminal S2' and the first contact portion 23 of the third signal terminal S3' along the straight line L, and the base portion 21 of the second signal terminal S2' and the base portion 21 of the third signal terminal S3' are located at a same side of the straight line L. Thus, the base portions 21 of the first signal terminal S1', the second signal terminal S2' and the third signal terminal S3' are respectively located at the two sides of the straight line L, and the second signal terminal S2' and the third signal terminal S3' located at the same side are separated and not in two adjacent rows, thus further increasing the distances between the base portions 21 of the three signal terminals S, and effectively reducing the crosstalk between the first signal terminal S1', the second signal terminal S2' and the third signal terminal S3'. Further, the base portion 21 of the second signal terminal S2' is located farther away from the base portion 21 of the third signal terminal S3' than the first contact portion 23 or the second contact portion 25 of the second signal terminal S2'. In other words, in the present embodiment, in addition to the base portion 21 of the first signal terminal S1' being adjusted, the base portion 21 of the second signal terminal S2' is also adjusted, and the location of the first contact portion 23 or the second contact portion 25 of the second signal terminal S2' maintains unchanged, thus further increasing the distance between the base portions 21 of the second signal terminal S2' and the third signal terminal S3' located at the same side of the straight line L, and more effectively improving the signal transmission characteristics of the electrical connector. It should be noted that, as described above, the first contact portion 23 of the first signal terminal S1' and the first contact portion 23 of the second signal terminal S2' are located in the straight line L in the same column. In other embodiments, it is possible that, viewing along the vertical direction Z, the second contact portion 25 of the first signal terminal S1' and the second contact portion 25 of the second signal terminal S2' are located in a straight line in a same column, and the base portion 21 of the first signal terminal S1' and the base portion 21 of the second signal terminal S2' are respectively located at two sides of the straight line. In other embodiments, it is also possible that the first contact portion 23 or the second contact portion 25 of the first signal terminal S1' and the first contact portion 23 or the second contact portion 25 of the second signal terminal S2' are located in a straight line in a same row, and the base portion 21 of the first signal terminal S1' and the base portion 21 of the second signal terminal S2' are respectively located at two sides of the straight line.

The pointing direction F1 of the first signal terminal S1' may be a direction being rotated by any feasible angle relative to the pointing direction F2 of the second signal terminal S2'. The first signal terminal S1' is located at an edge location of a terminal 2 area formed by the terminals 2, and the location at periphery of the edge without being provided with other terminals 2 may be utilized to provide a location adjusting space for the first signal terminal S1'. In addition, similar to the first embodiment, in the third embodiment, the first bodies 2A of the terminals 2 located in the same region are formed by cutting and punching a single-sheet material, and/or the second bodies 2B of the terminals 2 located in the same region are formed by cutting and punching a single-sheet material. Similarly, it is convenient for facilitating processing and enhancing the feasibility thereof.

It should be noted that, in the descriptions above, the three signal terminals S' located in the column C1 and respectively in the rows R1~R3 are selected from the signal terminals S' of the terminals 2 as shown in FIG. 14 to serve as the first signal terminal S1', the second signal terminal S2' and the third signal terminal S3' in order to describe the solutions. However, the first signal terminal S1', the second signal terminal S2' and the third signal terminal S3' of the technical solutions of the present invention may be the signal terminals S' at other locations. For example, the three signal terminals S' located in the column C3 and respectively in the rows R1~R3 may serve as the first signal terminal S1', the second signal terminal S2' and the third signal terminal S3'. Alternatively, the three signal terminals S' located in the column C1 and respectively in the rows R1, R4 and R5 may serve as the first signal terminal S1', the second signal terminal S2' and the third signal terminal S3'. Alternatively, the two signal terminals S' located in the column C5 and respectively in the rows R1 and R2 may serve as the first signal terminal S1' and the second signal terminal S2'. Various combinations may be applied.

In the three embodiments provided above, each terminal 2 is a double-sided compression type split terminal formed by the first body 2A and the second body 2B being in contact with each other. In other embodiments, each terminal may be a non-double-sided compression type terminal (such as replacing the second contact portion 25 by a soldering portion to be in contact with the circuit board), and each terminal 2 may be an integral-type terminal. It is possible that the first extending arm 22 and the first contact portion 23 of each terminal 2 are not provided to be symmetrical to the second extending arm 24 and the second contact portion 25 along the vertical direction Z. The base portion 21 of each terminal 2 may be a vertical base portion 21 extending along the vertical direction Z, without being limited to the horizontal base portion 21 facing upward or facing downward in the three embodiments as described above. In the three embodiments, each terminal 2 is formed by split structures. In other embodiments, the base portion 21 of each terminal 2 may be an integral structure to be simultaneously provided with the first extending arm 22 extending upward and the second extending arm 24 extending downward, and the whole terminal 2 is an integral structure formed by a sheet material. Alternatively, each terminal 2 has only the first body 2A or only the second body 2B, and is fixed to a surface of a conductive plate by the first body portion 211 of the first body 2A or the second body portion 212 of the second body 2B, and is respectively connected to the first electrical component and the second electrical component by one of the first extending arm 22 or the second extending arm 24 and the conductive portions on the other surface of the conductive plate. The structures of the terminals 2 and the overall aspects of the electrical connector in the three embodiments as described above are merely provided schematically, and are not intended to limit the specific aspects of the terminals 2 and the electrical connector.

In sum, the electrical connector according to certain embodiments of the present invention has the following beneficial effects:

1. In the present invention, the distances between two pairs of differential terminals (or the distance between two of the signal terminals) may be increased, thus reducing the mutual crosstalk between the two pairs of differential terminals (or the two signal terminals). Further, there is no need to adjust the locations of the first conductive portions of the first electrical component or the second conductive portions of the second electrical component, and the first electrical component or the second electrical component originally adopted may be directly used, thus enhancing the adaptability of the electrical connector. Meanwhile, the technical solutions of certain embodiments of the present invention have a simple technique and reduce the production cost thereof.
2. In certain embodiments of the present invention, by providing the first pair of differential terminals or the first signal terminal at the edge location of the terminal area, the location at periphery of the edge location without being provided with other terminals may be utilized to provide a location adjusting space for the first pair of differential terminals or the first signal terminal.

3. In certain embodiments of the present invention, the plate surfaces of the base portion of each terminal face the vertical direction, and the first bodies of the terminals located in the same region are formed by cutting and punching a single-sheet material, such that the pointing directions of the terminals may be confirmed during the cutting, which is convenient for facilitating processing and enhancing the feasibility thereof.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An electrical connector, comprising:

an insulating body, comprising at least one region, wherein one region of the at least one region has a plurality of accommodating slots; and a plurality of terminals, accommodated in the accommodating slots in the one region, wherein each of the terminals has a base portion and an extending arm extending from the base portion, the extending arm is provided with a contact portion, the contact portion is configured to be in contact with an electrical component along a vertical direction, the contact portions of the terminals are arranged in the one region in a plurality of rows and a plurality of columns based on a constant first row distance and a constant first column distance; the base portion has a first reference point, the contact portion has a second reference point, and viewing from the vertical direction, a direction from the first reference point toward the second reference direction is defined as a pointing direction corresponding to each of the terminals;

wherein the terminals located in the one region comprise a first signal terminal and a second signal terminal, viewing along the vertical direction, the pointing direction of the first signal terminal and the pointing direction of the second signal terminal are different from each other, and the base portion of the first signal terminal is located farther away from the base portion of the second signal terminal than the contact portion of the first signal terminal.

2. The electrical connector according to claim 1, wherein viewing along the vertical direction, the contact portion of the first signal terminal and the contact portion of the second signal terminal are located in a straight line of a same row or a same column, and the base portion of the first signal terminal and the base portion of the second signal terminal are respectively located at two sides of the straight line.

3. The electrical connector according to claim 2, wherein the terminals comprises a third signal terminal, viewing along the vertical direction, the contact portion of the first signal terminal, the contact portion of the second signal terminal and the contact portion of the third signal terminal are all located in the straight line, the contact portion of the first signal terminal is located between the contact portion of the second signal terminal and the contact portion of the third signal terminal along the straight line, and the base portion of the second signal terminal and the base portion of the third signal terminal are located at a same side of the straight line.

4. The electrical connector according to claim 3, wherein the base portion of the second signal terminal is located farther away from the base portion of the third signal terminal than the contact portion of the second signal terminal.

5. The electrical connector according to claim 1, wherein the terminals further comprise at least one ground terminal provided to be adjacent to the second signal terminal, and the pointing direction of the second signal terminal and the pointing direction of the ground terminal are identical to each other.

6. The electrical connector according to claim 1, wherein the terminals further comprises a third signal terminal, the pointing direction of the first signal terminal, the pointing direction of the second signal and the pointing direction of the third signal terminal are different from one another, the base portion of the first signal terminal, the base portion of the second signal terminal and the base portion of the third signal terminal are away from one another, and the first signal terminal, the second signal terminal and the third signal terminal are all configured to transmit single-ended signals.

7. The electrical connector according to claim 1, wherein each of the terminals comprises a first body and a second body, the first body has a first body portion and the extending arm extending from the first body portion, the second body has a second body portion, a plate surface of the first body portion and a plate surface of the second body portion are in communication with each other along the vertical direction and altogether form the base portion of each of the terminals, and the first bodies of the terminals located in the one region are formed by cutting and punching a single-sheet material; or the base portion of each of the terminals has two plate surfaces provided opposite to each other along the vertical direction, and the base portions and the extending arms of the terminals located in the one region are formed by cutting and punching a single-sheet material.

8. An electrical connector, comprising:

an insulating body, comprising at least one region, wherein one of the at least one region has a plurality of accommodating slots; and a plurality of terminals, accommodated in the accommodating slots in the one region, wherein each of the terminals has a base portion and an extending arm extending from the base portion, the extending arm is provided with a contact portion, the contact portion is configured to be in contact with an electrical component along a vertical direction, the contact portions of the terminals are arranged in the one region in a plurality of rows and a plurality of columns based on a constant first row distance and a constant first column distance; the base portion has a first reference point, the contact portion has a second reference point, and viewing from the vertical direction, a direction from the first reference point toward the second reference direction is defined as a pointing direction corresponding to each of the terminals;

wherein the terminals located in the one region comprises a first pair of differential terminals and a second pair of differential terminals, the first pair of differential terminals comprises a first terminal and a second terminal provided to be adjacent to each other, the pointing direction of the first terminal and the pointing direction of the second terminal are identical, the second pair of differential terminals comprises a third terminal and a fourth terminal provided to be adjacent to each other, the pointing direction of the third terminal and the pointing direction of the fourth terminal are identical, viewing along the vertical direction, the pointing direction of the first terminal and the pointing direction of the third terminal are different from each other, and the base portion of the first terminal is located farther away from the base portion of the third terminal than the contact portion of the first terminal.

9. The electrical connector according to claim 8, wherein the pointing direction of the first terminal and the pointing direction of the third terminal are parallel and opposite to each other.

10. The electrical connector according to claim 8, wherein the two contact portions of the first pair of differential terminals and the two contact portions of the second pair of differential terminals are located in two adjacent ones of the rows, the contact portion of the third terminal and the contact portion of the fourth terminal and the contact portions of a plurality of non-differential terminals are located in a same row of the rows, and the pointing direction of each of the non-differential terminals and the pointing direction of the third terminal are identical.

11. The electrical connector according to claim 8, wherein the first pair of differential terminals are located at an edge location of a terminal area formed by the terminals.

12. The electrical connector according to claim 8, wherein each of the terminals comprises a first body and a second body, the first body has a first body portion and the extending arm extending from the first body portion, the second body has a second body portion, the first body portion and the second body portion are in communication with each other, a plate surface of the first body portion and a plate surface of the second body portion are provided opposite to each other along the vertical direction, the base portion comprises the first body portion and the second body portion, and the first bodies of the terminals located in the one region are formed by cutting and punching a single-sheet material; or the base portion of each of the terminals has two plate surfaces provided opposite to each other along the vertical direction, and the base portions and the extending arms of the terminals located in the one region are formed by cutting and punching a single-sheet material.

13. The electrical connector according to claim 8, wherein the two contact portions of the first pair of differential terminals and the two contact portions of the second pair of differential terminals are located in two adjacent ones of the rows, the contact portion of the first terminal, the contact portion of the second terminal, the contact portion of the third terminal and the contact portion of the fourth terminal are located in four adjacent ones of the columns, and the pointing direction of the first terminal and the pointing direction of the third terminal are provided opposite to each other.

14. The electrical connector according to claim 13, wherein the terminals further comprise a third pair of differential terminals, the third pair of differential terminals comprises a fifth terminal and a sixth terminal provided to be adjacent to each other, the pointing direction of the fifth terminal and the pointing direction of the sixth terminal are identical, and viewing along a column direction, projections of the first pair of differential terminals and projections of the second pair of differential terminals are completely staggered.

15. The electrical connector according to claim 14, wherein the contact portion of the third terminal and the contact portion of the fifth terminal are located in a same one of the columns, the contact portion of the fourth terminal and the contact portion of the sixth terminal are located in a same one of the columns, the terminals have two non-differential terminals located between the second pair of differential terminals and the third pair of differential terminals along the column direction, and the pointing direction of the third terminal, the pointing direction of the fifth terminal and the pointing direction of each of the non-differential terminals located between the second pair of differential terminals and the third pair of differential terminals are identical.

* * * * *